United States Patent [19]
Yuen et al.

[11] Patent Number: 6,160,803
[45] Date of Patent: Dec. 12, 2000

[54] HIGH PROCESSING GAIN SPREAD SPECTRUM TDMA SYSTEM AND METHOD

[75] Inventors: Elmer Yuen, New York; Donald L. Schilling, Sands Point, both of N.Y.; Joseph Garodnick, Centerville, Mass.

[73] Assignee: Golden Bridge Technology, Inc., West Long Branch, N.J.

[21] Appl. No.: 09/005,926

[22] Filed: Jan. 12, 1998

[51] Int. Cl.[7] .......................... H04B 7/216; H04B 7/212; H04J 3/04

[52] U.S. Cl. .......................... 370/342; 370/347; 370/535; 375/143

[58] Field of Search .......................... 370/337, 347, 370/342, 335, 350, 535, 208, 206; 375/143, 200, 206, 207, 305, 307, 343

[56] References Cited

U.S. PATENT DOCUMENTS

| | | | |
|---|---|---|---|
| 5,099,204 | 3/1992 | Wheatley, III | 330/279 |
| 5,107,225 | 4/1992 | Wheatley, III et al. | 330/279 |
| 5,410,568 | 4/1995 | Schilling | 375/205 |
| 5,504,776 | 4/1996 | Yamaura et al. | 375/208 |
| 5,862,133 | 1/1999 | Schilling | 370/342 |

*Primary Examiner*—Alpus H. Hsu
*Assistant Examiner*—Duc Ho
*Attorney, Agent, or Firm*—David Newman Chartered

[57] ABSTRACT

A system and method for encoding and transmitting data with a spread-spectrum time-division-multiple-access (SS-TDMA) system. Data to be transmitted by a SS-TDMA transmitter are sent within a particular specified group of time slots. Random packets also can be sent by transmission during an open time slot. The TDMA data are demultiplexed into sub-data-sequence signals, each of which are spread-spectrum processed and then combined as a multichannel, BPSK, QPSK or QAM spread-spectrum signal. The multi-channel spread-spectrum signal is concatenated with a header to output a packet-spread-spectrum signal which is transmitted over radio waves to a packet receiver. The packet receiver obtains timing for the multichannel spread-spectrum signal from the header. The multichannel spread-spectrum signal is then despread and multiplexed as received-TDMA data. The received-TDMA data are selected from a particular time slot by the intended recipient and stored in a receiver memory for output.

29 Claims, 6 Drawing Sheets

HIGH PROCESSING GAIN SPREAD SPECTRUM TDMA SYSTEM AND METHOD

BACKGROUND OF THE INVENTION

This invention relates to a spread-spectrum time-division-multiple-access (SS-TDMA) system having high processing gain, and more particularly to a SS-TDMA system employing a multichannel spread-spectrum modulation for achieving the high processing gain.

DESCRIPTION OF THE RELEVANT ART

Time division multiple access (TDMA) systems are inefficient, since TDMA systems require frequency reuse to protect from adjacent channel interference. In addition, TDMA systems suffer from Rayleigh fading caused by multipath interference. Thus, many investigators have proposed spreading the TDMA signal, since spread-spectrum modulation offers immunity to multipath and adjacent channel interference. Users in adjacent channels employ different spreading sequences and spread-spectrum modulation systems have the ability to minimize multipath interference, provided that the spread bandwidth and processing gain are sufficiently high.

The problem with TDMA/CDMA systems is that at high bit rates, the processing gain is very small. For example, consider a GSM type system used for 384 kilobits per second (kb/s). With forward error correction (FEC) and overhead, the transmitted data rate can be assumed to be approximately 800 kb/s. Since eight users share a single frequency band, a bandwidth of 8×800 kb/s=6.4 MHz is required. If the chip rate were approximately 5 megachips per second, then the processing gain (PG) is approximately 0.8. This processing gain is hardly sufficient. In fact, the Federal Communications Commission (FCC) requires a minimum processing gain of ten (PG=10) to qualify as a spread-spectrum system operating in the industrial-scientific-medical (ISM) band. If the TDMA system were to operate with additional users (time slots), then the processing gain would decrease further.

SUMMARY OF THE INVENTION

A general object of the invention is a spread-spectrum time-division-multiple-access (SS-TDMA) system having a processing gain to qualify as a spread-spectrum system.

Another object of the invention is a SS-TDMA system which can overcome the detrimental effects of multipath.

A further object of the invention is a SS-TDMA system which allows users within a cell to use the same chip-sequence signals.

A still further object of the invention is a SS-TDMA system which allows a high data rate transmission with processing gain independent of data rate.

Another object of the invention is a SS-TDMA system which allows packet switching of high data rate random packets.

According to the present invention, as embodied and broadly described herein, a SS-TDMA system is provided comprising a plurality of SS-TDMA transmitters that communicate with a plurality of SS-TDMA receivers using radio waves. Each of the SS-TDMA transmitters includes a transmitter-first-in-first-out (transmitter-FIFO) memory, a transmitter TDMA subsystem, a demultiplexer, chip-sequence means, a plurality of product devices, a combiner, a header device, and a transmitter-carrier subsystem. Each SS-TDMA receiver includes a translating device, a header-matched filter, a processor, a plurality of data-matched filters, a multiplexer, a receiver TDMA subsystem, and a receiver-first-in-first-out (receiver-FIFO) memory.

In the SS-TDMA transmitter, the transmitter-FIFO memory stores data from a data input. The transmitter TDMA subsystem sends the data, within a time slot assigned by a base station from the transmitter-FIFO memory as TDMA data. By the term "transmitter TDMA subsystem" for sending data from the transmitter-FIFO memory, is meant sending the data in a packet, as is well known in the art of TDMA systems. The term "TDMA data" as used herein is meant to include data formatted for a TDMA system. The demultiplexer demultiplexes the TDMA data into a plurality of sub-data-sequence signals. The sub-data-sequence signals may be symbols, which are well known in the art. A respective sub-data-sequence signal is outputted from a respective output of the demultiplexer. As used herein, the term "sub-data-sequence signal" is a demultiplexed part of the TDMA data.

Only one SS-TDMA transmitter, at a remote unit, transmits at a time, preferably to a base station. The SS-TDMA transmitter transmits its information during a time slot set aside for the remote unit, as is used in ordinary TDMA systems.

The chip-sequence means outputs a plurality of chip-sequence signals, and the plurality of product devices, which may be embodied as a plurality of exclusive-OR gates, multiplies each of the sub-data-sequence signals by a respective chip-sequence signal. Each of the chip-sequence signals is preferably orthogonal or has low correlation to the other chip-sequence signals in the plurality of chip-sequence signals. A plurality of chip-sequence signals having low correlation, however, would work poorly, having a higher error rate that a plurality of chip-sequence signals which are orthogonal. At the output of the plurality of product devices is a plurality of spread-spectrum channels.

The combiner algebraically combines the plurality of spread-spectrum channels as a multichannel-spread-spectrum signal. The multichannel-spread-spectrum signal can be binary-phase-shift-keyed (BPSK) modulated onto a carrier signal. Alternatively, a first portion of the plurality of spread-spectrum signals can be combined as a first multichannel-spread-spectrum signal, which can modulate an in-phase component of a carrier signal.

A second (remaining) portion of the plurality of spread-spectrum signals can be combined as a second multichannel-spread-spectrum signal, which modulate a quadrature-phase component of the carrier frequency.

The header device adds, i.e., concatenates, the multichannel-spread-spectrum signal to a header. The header device outputs a SS-TDMA-spread-spectrum signal. The header later provides chip-sequence synchronization at the receiver. The transmitter-carrier subsystem amplifies and transmits, at a carrier frequency, the SS-TDMA-spread-spectrum signal using radio waves over a communications channel.

A SS-TDMA-spread-spectrum signal, as used herein, is a spread-spectrum signal transmitted by one or more SS-TDMA transmitters, and arriving at the input of one or more SS-TDMA receivers. The SS-TDMA-spread-spectrum signal has the header concatenated with the multichannel-spread-spectrum signal. Timing for the present invention may be triggered from the header as part of the SS-TDMA-spread-spectrum signal. For the case of the SS-TDMA-spread-spectrum signal, each SS-TDMA has the header followed in time by the multichannel-spread-spectrum signal. The header and multichannel-spread-spectrum signal are sent as the SS-TDMA-spread-spectrum signal, and the timing for the multichannel-spread-spectrum signal, and thus the data, in the SS-TDMA-spread-spectrum signal is keyed from the header. The data in the multichannel-spread-spectrum signal may contain information such as data, digitized voice, digitized video, signaling, adaptive power control (APC), tracking signals, cyclic-redundancy-check (CRC) code, forward error correction code, etc.

The header, or preamble, is generated from spread-spectrum processing a header-symbol-sequence signal with a chip-sequence signal. The multichannel-spread-spectrum signal part of the SS-TDMA-spread-spectrum signal is generated from spread-spectrum processing a plurality of sub-data-sequence signals with the plurality of chip-sequence signals, respectively.

The chip-sequence signal used for the header and the plurality of chip-sequence signals used with the plurality of sub-data-sequence signals may be common to all users. The use of common chip-sequence signals achieves low cost, since all users can use the same circuitry, e.g., a plurality of matched filters having impulses matched to the plurality of chip-sequence signals, and circuitry for changing chip-sequence signals is not required.

At each of the SS-TDMA receivers, the translating device translates the SS-TDMA-spread-spectrum signal from the carrier frequency to a processing frequency. The processing frequency may be at a radio frequency (RF), intermediate frequency (IF) or, in a preferred embodiment, at baseband frequency. The processing frequency is a design choice, and any of the frequency ranges may be used by the invention. The header-matched filter detects the header in the SS-TDMA-spread-spectrum signal. In response to detecting the header, the header-matched filter outputs a header-detection signal. The processor, in response to the header-detection signal, generates control and timing signals.

The plurality of data-matched filters despreads the multichannel-spread-spectrum signal embedded in the SS-TDMA-spread-spectrum signal, as a plurality of received spread-spectrum channels. The multiplexer multiplexes the plurality of despread spread-spectrum channels as received-TDMA data. The receiver TDMA subsystem selects, in a time slot i from a sequence of time slots, the received-TDMA data from terminal i as received data. The receiver-FIFO memory stores the received data and outputs the received data to a data output. The received data is a single data stream. In an error-free environment, the received data are identical to the data input to the transmitter.

Another aspect of the present invention includes a SS-TDMA system comprising a plurality of SS-TDMA transmitters that communicate with a plurality of SS-TDMA receivers using radio waves. In a preferred embodiment, the plurality of SS-TDMA transmitters are part of a plurality of remote units respectively. The plurality of remote units communicate with a base station. A handoff or handover, transfers communication to an alternative, specified, base station.

Each of the SS-TDMA transmitters includes a transmitter-first-in-first-out (transmitter-FIFO) memory, a transmitter TDMA subsystem, a demultiplexer, chip-sequence means, a first plurality of product devices, a first combiner, a first header device, a second plurality of product devices, a second combiner, a second header device, and a transmitter-carrier subsystem. Each SS-TDMA receiver includes a translating device, a processor, a first plurality of data-matched filters, a second plurality of data-matched filters, a first plurality of header-matched filters, a second plurality of header-matched filters, a multiplexer, a receiver TDMA subsystem, and a receiver-first-in-first-out (receiver-FIFO) memory.

In the SS-TDMA transmitter, the transmitter-FIFO memory stores data from a data input. The TDMA subsystem sends the data, within a time slot assigned by a base station, from the transmitter-FIFO memory as TDMA data. The demultiplexer demultiplexes the TDMA data into a first plurality of sub-data-sequence signals and a second plurality of sub-data-sequence signals. A respective sub-data-sequence signal is outputted from a respective output of the demultiplexer.

The chip-sequence means outputs a plurality of chip-sequence signals, and the first plurality of product devices and the second plurality of product devices, which may be embodied as exclusive-OR gates, multiplies each of the first plurality of sub-data-sequence signals and each of the second plurality of sub-data-sequence signals by a respective chip-sequence signal. Each of the chip-sequence signals used to multiply each of the first plurality of sub-data-sequence signals, is orthogonal or has low correlation to the other chip-sequence signals in the plurality of chip-sequence signals. The plurality of chip-sequence signals used with the first plurality of sub-data-sequence signals may be the same and used with the second plurality of sub-data-sequence signals. At the output of the first plurality of product devices is a first plurality of spread-spectrum channels, and at the output of the second plurality of product devices is a second plurality of spread spectrum channels.

The first combiner algebraically combines the first plurality of spread-spectrum channels as a first multichannel-spread-spectrum signal. The first header device adds, i.e., concatenates, the first multichannel-spread-spectrum signal to a first header. The first header device outputs a first SS-TDMA-spread-spectrum signal. The first header later provides chip-sequence synchronization at the receiver.

The second combiner algebraically combines the second plurality of spread-spectrum channels as a second multichannel-spread-spectrum signal. The second header device adds, i.e., concatenates, the second multichannel-spread-spectrum signal to a second header. The second header device outputs a second SS-TDMA-spread-spectrum signal. The second header later provides chip-sequence synchronization at the receiver. The transmitter-carrier subsystem amplifies and transmits, at a carrier frequency, the first SS-TDMA-spread-spectrum signal and the second SS-TDMA-spread-spectrum signal as a quadrature-amplitude modulated (QAM) signal, using spread-spectrum radio waves over a communications channel. Binary-phase-shift-keying modulation could be used in place of QAM modulation. QAM modulation, which is well defined in the technical literature, has an in-phase component and a quadrature-phase component, each of which may have several possible choices of amplitude.

A QAM-spread-spectrum signal, as used herein, is a spread-spectrum signal transmitted by one or more SS-TDMA transmitters, and arriving at the input of one or more SS-TDMA receivers. The QAM-spread-spectrum signal has the first header and second header concatenated with the first multichannel-spread-spectrum signal and the second multichannel-spread-spectrum signal, respectively. Timing for the present invention may be triggered from the first and second headers as part of the QAM-spread-spectrum signal. For the case of the QAM-spread-spectrum signal, each SS-TDMA spread-spectrum signal has the first header followed in time by the first multichannel-spread-spectrum signal, and the second header followed in time by the second multichannel-spread-spectrum signal. The first and second headers and the first and second multichannel-spread-spectrum signals are sent as the QAM-spread-spectrum signal, and the timing for the multichannel-spread-spectrum signal, and thus the data, in the QAM-spread-spectrum signal is keyed from the first and second headers. The data in the first and second multichannel-spread-spectrum signals may contain information such as digitized voice or data, signalling, adaptive power control (APC), timing, CRC code, FEC code, etc.

The first and second headers, or preambles, are generated from spread-spectrum processing a header-symbol-sequence signal with a chip-sequence signal. The first and second multichannel-spread-spectrum signal parts of the QAM-spread-spectrum signal are generated from spread-spectrum processing the first and second plurality of sub-data-sequence signals, respectively, with the plurality of chip-sequence signals.

The chip-sequence signal used for the first and second headers and data is common to all users. The use of a common chip-sequence signal achieves low cost, since circuitry for changing chip-sequence signals is not required.

At each of the SS-TDMA receivers, the translating device translates the SS-TDMA-spread-spectrum signal from the carrier frequency to a processing frequency. The processing frequency may be at a radio frequency (RF), intermediate frequency (IF) or at baseband frequency. The processing frequency is a design choice, and any of the frequency ranges may be used by the invention. The header-matched filter detects the first and second headers in the QAM-spread-spectrum signal. In response to detecting the first and second headers, the header-matched filter outputs a frame-detection signal. The processor, in response to the frame-detection signal, generates control and timing signals.

The first and second plurality of data-matched filters despread the first and second multichannel-spread-spectrum signals embedded in the QAM-spread-spectrum signal, as a first and second plurality of received, despread, spread-spectrum channels, respectively. The multiplexer multiplexes the first and second plurality of received, despread, spread-spectrum channels as received-TDMA data. The receiver TDMA subsystem selects, in a time slot from a sequence of time slots, the received-TDMA data as received data. The receiver-FIFO memory stores the received data and outputs the received data to a data output. In an error-free environment, the received data are identical to the data input to the transmitter.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like numerals indicate like elements throughout the several views.

Figure 1:
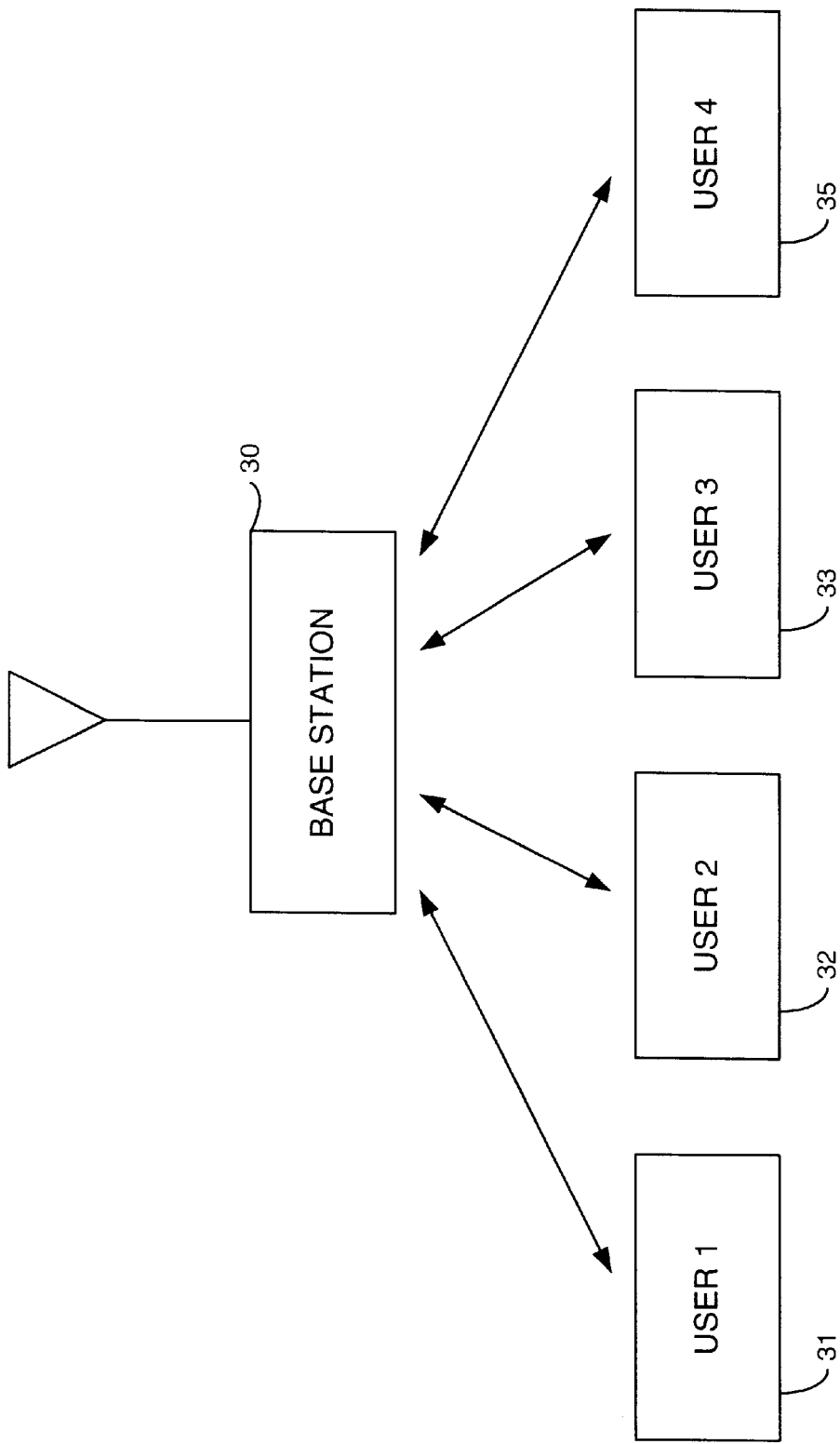
FIG. 1 illustrates a SS-TDMA system.

The present invention provides a new and novel SS-TDMA system, illustrated in FIG. 1, using a SS-TDMA-spread-spectrum signal. The SS-TDMA system might be used as part of a radio based ethernet system, or an ATM system, or any other networked system. The SS-TDMA system could be used for connection as well as connection-less applications. The SS-TDMA system includes a base station 30 communicating with a plurality of users 31, 32, 33, 34. The SS-TDMA system alternatively could be used to communicate between two users, i.e., a peer-to-peer system, or several base stations could be accessed when needed.

In a particular embodiment, for a communications link from a user 31 to a base station 30, the base station 30 has a SS-TDMA receiver, and each user has a SS-TDMA transmitter. Although each user 31, 32, 33 may transmit at a constant power level, the power level of each signal arriving at the base station 30 from each user 31 most likely is different. Since the signal from each user arrives in a time slot different from the other user, the power level of the signal from one user does not interfere with the power level of the signal from another user. The use of TDMA time slots makes the signals arriving from each user orthogonal to the other users. The use of TDMA time slots lessens near-far power control problems, and is thus advantageous over code-division-multiple-access (CDMA) systems which have near-far power control problems.

The sequence of time slots for each user preferably is controlled and coordinated at the base station 30. A particular time slot, within a sequence of time slots, is assigned and communicated from the base station 30, preferably in a header, to each user.

The present invention is the SS-TDMA link, which in a preferred embodiment, is from a user, such as the user 31, to the base station 30. The present invention is illustrated, by way of example, with a SS-TDMA transmitter transmitting the spread-spectrum TDMA signal to a SS-TDMA receiver.

For a communications link from the base station 30 to a user 31, CDMA may be used without TDMA. The base station 30 can transmit at a constant power level, which allows CDMA to be used since the power level for each channel of the CDMA system is relatively constant, when arriving at each user. Also, each user's spread-spectrum signal or plurality of spread-spectrum signals in the CDMA system is orthogonal to other users, since transmission is from a single source, the base station, and orthogonal chip-sequence signals are used for spreading.

The SS-TDMA-spread-spectrum signal, in a preferred embodiment, includes a header, followed in time by a multichannel-spread-spectrum signal. The header is concatenated with the multichannel-spread -spectrum signal. The header is generated from spread-spectrum processing, by using techniques well known in the art, a header-symbol-sequence signal with a chip-sequence signal. The headersymbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal. The header, in a preferred embodiment, includes a chip-sequence signal used for the purpose of synchronization.

Each spread-spectrum channel of the multichannel-spread-spectrum signal part of the SS-TDMA-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user defined, and preferably is orthogonal to other chip-sequence signals used for generating the plurality of spread-spectrum channels. The demultiplexing of data and spread-spectrum modulating each demultiplexed channel as a spread-spectrum signal and forming a multichannel spread-spectrum signal, keeps processing gain (PG) constant, independent of data rate. For a high data rate, for example, the multichannel spread-spectrum signal may include 128 channels. Sixty-four channels may be on an in-phase component and sixty-four channels may be on a quadrature-phase component.

SS-TDMA System

The present invention broadly comprises a SS-TDMA system for communicating data between a plurality of SS-TDMA transmitters and a plurality of SS-TDMA receivers, preferably using radio waves. The terms "SS-TDMA transmitter" and "SS-TDMA receiver", as used herein, denote the overall system components for transmitting and receiving, respectively, data.

Each SS-TDMA transmitter includes transmitter-memory means, transmitter TDMA means, demultiplexer means, transmitter-spread-spectrum means, combiner means, header means, and transmitter-carrier means. The transmitter TDMA means is coupled to the transmitter-memory means. The demultiplexer means, which is coupled to the transmitter TDMA means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The transmitter TDMA means sends the data, within an assigned time slot, from the transmitter-memory means as TDMA data. The demultiplexer means demultiplexes the TDMA data into a plurality of sub-data-sequence signals, with a respective sub-data-sequence signal at a respective output of the demultiplexer means. The transmitter-spread-spectrum means spread-spectrum processes each of the sub-data-sequence signals with a respective chip-sequence signal. The output of the transmitter-spread-spectrum means is a plurality of spread-spectrum channels, with each spread-spectrum channel corresponding to one of the outputs of the demultiplexer means. The combiner means algebraically combines the plurality of spread-spectrum channels as a multichannel-spread-spectrum signal. The header means concatenates a header to the multichannel-spread-spectrum signal. The header is for chip-sequence synchronization. At the output of the header means is the SS-TDMA-spread-spectrum signal. The transmitter-carrier means transmits, at a carrier frequency, the SS-TDMA-spread-spectrum signal, using radio waves, over a communications channel.

The header preferably includes information from the base station 30 for each user 31, 32, 33, as to which time slot a user is using. Alternatively, the time slot information may be sent as part of the data.

Each of the SS-TDMA receivers includes translating means, header-detection means, processor means, receiver-spread-spectrum means, multiplexing means, receiver TDMA means, and receiver-memory means. The translating means is coupled to the communications channel. The header-detection means is coupled between the translating means and the processor means. The receiver-spread-spectrum means is coupled to the translating means and to the multiplexing means. The receiver TDMA means is coupled between the multiplexing means and the receiver-memory means. At the output of the receiver-memory means are the received data.

The translating means translates the received SS-TDMA-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the header embedded in the SS-TDMA-spread-spectrum signal. The header-detection means outputs, in response to detecting the header, a header-detection signal.

The processor means generates control and timing signals. These signals are used for controlling sequences and timing of the invention.

The receiver-spread-spectrum means despreads the multichannel spread-spectrum signal of the SS-TDMA-spread-spectrum signal, as a plurality of spread-spectrum signals. The multiplexing means multiplexes the plurality of spread-spectrum signals as the TDMA data. The receiver TDMA means selects, within a time slot from a sequence of time slots, the received-TDMA data as received data, and the receiver memory means stores the received data from the receiver TDMA means and outputs the received data.

Figure 2:
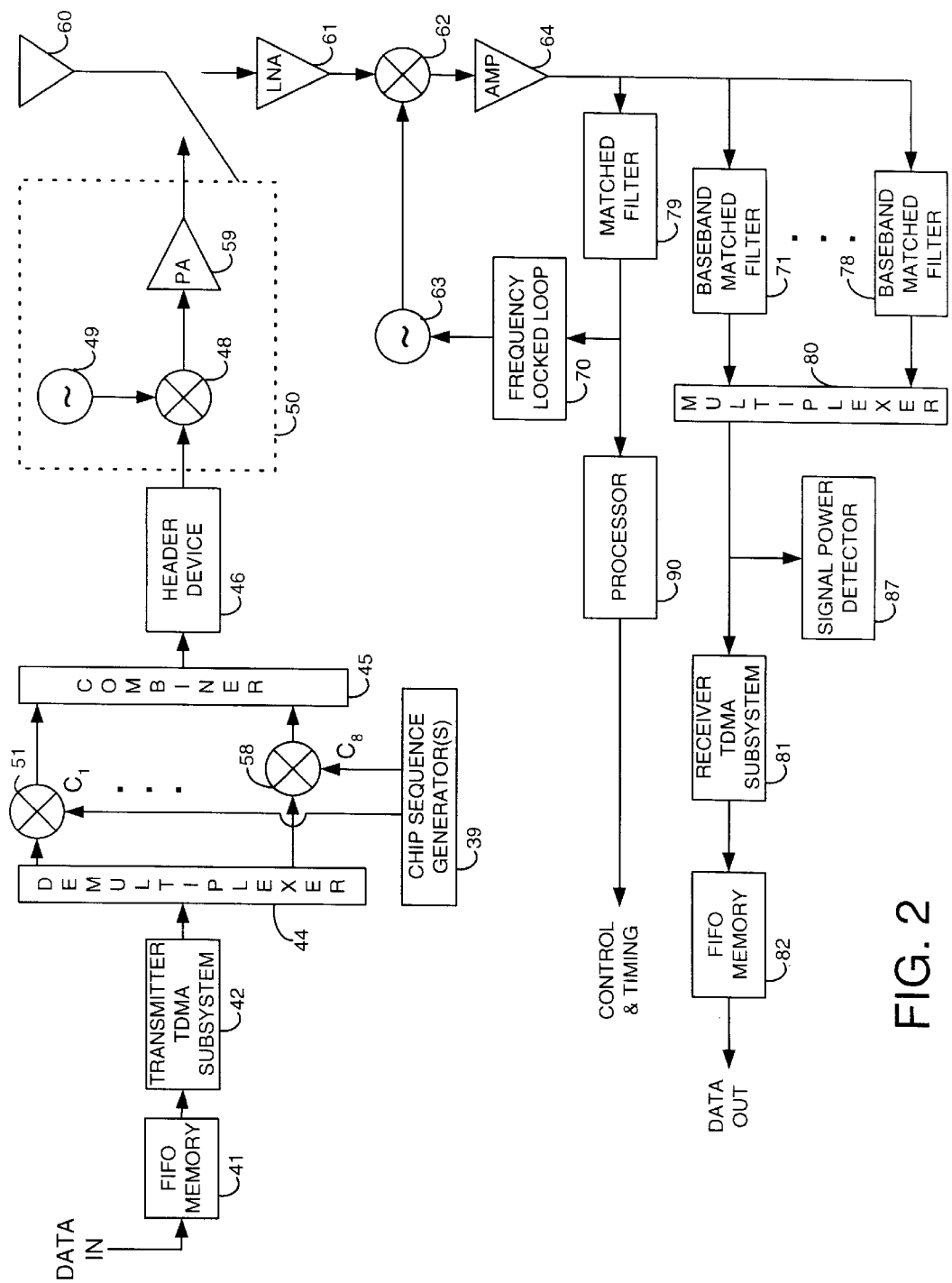
FIG. 2 is a block diagram of a SS-TDMA transmitter and a SS-TDMA receiver.

In the exemplary arrangement shown in FIG. 2, the transmitter-memory means is embodied as a transmitter-first-in-first-out (transmitter-FIFO) memory 41. Means for FEC encoding, CRC code, signaling, maintenance, etc, may be added, in transmitter-FIFO memory 41, or incorporated as additional logic or circuitry to transmitter-FIFO memory 41. The transmitter-FIFO memory 41 may employ random access memory (RAM) or other memory components as is well known in the art. The transmitter-FIFO memory 41 may be part of a digital signal processor (DSP); or, preferably, part of an application specific integrated circuit (ASIC).

For the case of an analog signal, an analog-to-digital converter would be inserted before the input to the transmitter-FIFO memory 41 for converting the analog signal to data. The analog-to-digital converter may be a one bit analog-to-digital converter, i.e., a hard limiter.

The transmitter TDMA means is embodied as a transmitter TDMA subsystem 42. The transmitter TDMA subsystem 42 may be a TDMA circuit for sending or gating data within a particular time slot, set by base station 30. The particular time slots and sequence of time slots are communicated from base station 30 to each user, and used in the transmitter TDMA subsystem 42. Circuits are well known in the art for sending data in a time slot of a transmitter TDMA system.

The transmitter TDMA subsystem 42 sends the data from the transmitter-FIFO memory 41, as TDMA data. The TDMA process may include using any time slots, as coordinated from the base station 30, for uniquely distinguishing, as TDMA data, a particular data channel. The term TDMA data, as used herein, broadly means data that are transmitted in a particular time slot.

The demultiplexing means is embodied as a demultiplexer 44. The demultiplexer 44 has a plurality of outputs, with each output having a demultiplexed portion of the TDMA data.

The transmitter-spread-spectrum means is embodied as a chip-sequence means and a plurality of product devices 51, 58. The chip-sequence means may be embodied as a chip-sequence generator 39 for generating a plurality of chip-sequence signals. Alternatively, the transmitter-spread-spectrum means may be embodied as a plurality of EXCLUSIVE-OR gates, or equivalent logic devices or circuitry, coupled between the plurality of outputs of the demultiplexer and a memory device for storing the plurality of chip-sequence signals. In this embodiment, the memory device outputs a respective chip-sequence signal to the respective sub-data-sequence signal. A third alternative may include having the transmitter-spread-spectrum means embodied as a memory device, with appropriate detection circuitry so that in response to a particular data symbol or data bit at the output of a particular output the demultiplexer, a chip-sequence signal is substituted for that data symbol or data bit. The transmitter-spread-spectrum means may also be embodied as any other technology known in the art capable of outputting a plurality of chip-sequence signals.

The combining means is embodied as a combiner 45, the header means is embodied as a header device 46 for concatenating a header with data, and the transmitter-carrier means is embodied as a transmitter-carrier subsystem 50. The transmitter-carrier subsystem 50 may include an oscillator 49 and multiplier device 48 for shifting a signal to a carrier frequency, and a power amplifier 59 and/or other circuitry as is well known in the art for transmitting a signal over a communications channel. The signal is transmitted using an antenna 60.

As shown in FIG. 2, the transmitter TDMA subsystem 42 is coupled between the transmitter-FIFO memory 41 and the demultiplexer 44. The chip-sequence generator 39 is coupled to the plurality of product devices 51, 58. The combiner 45 is coupled between the plurality of product devices 51, 58 and the header device 46, and the header device 46 is coupled to the transmitter-carrier subsystem 50.

The transmitter-FIFO memory 41 receives data from a data input, and stores the data.

The transmitter TDMA subsystem 42 sends the data from the transmitter-FIFO 41 as TDMA data. The transmitter TDMA subsystem 42 sends the data using a particular time slot in a sequence of time slots, set by base station 30. The transmitter TDMA subsystem 42 is necessary for distinguishing data from different users. By sending data in the proper time slots, data from a particular user are distinguished from data from other users. Thus, the sending of the data in a particular time slot is what defines a user's channel, unlike other multichannel spread-spectrum systems, where a user's channel is defined by a particular chip-sequence signal.

By sending the data with the transmitter TDMA subsystem 42, a common set of chip-sequence signals can be used by all users, reducing cost of having matched filters or correlators. The reduced cost is achieved since, at a receiver, only one set of matched filters or correlators would be required for the despreading the multichannel-spread-spectrum signal from all users, and different sets of matched-filters or correlators are not required for each user.

The demultiplexer 44 demultiplexes the TDMA data into a plurality of sub-data-sequence signals, for example, 128 sub-data-sequence signals, with a respective sub-data-sequence signal at a respective output of the demultiplexer 44. The demultiplexer 44 may be embodied as a serial-to-parallel converter.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The plurality of product devices 51, 58, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The plurality of product devices 51, 58 multiplies each of the sub-data-sequence signals by a respective chip-sequence signal. At the output of the plurality of product devices 51, 58 is a plurality of spread-spectrum channels, respectively. A particular spread-spectrum channel is identified by the chip-sequence signal that was used to spread-spectrum process the particular sub-data sequence signal.

The combiner 45 algebraically combines the plurality of spread-spectrum channels, and outputs the combined signal as a multichannel-spread-spectrum signal. Preferably, the combiner 45 combines the plurality of spread-spectrum channels linearly, although some nonlinear process may be involved without significant degradation in system performance.

The header device 46 concatenates a header to the multichannel-spread-spectrum signal. At the output of the header device 46 is the SS-TDMA-spread-spectrum signal. The header is for chip-sequence synchronization at the receiver.

The transmitter-carrier subsystem 50 transmits, at a carrier frequency, the SS-TDMA-spread-spectrum signal using radio waves over a communications channel. The transmitter-carrier subsystem 50 of the SS-TDMA transmitter includes appropriate filters, power amplifiers and matching circuits coupled to an antenna 60. The transmitter-carrier subsystem 50 also may include a hard limiter, for hard limiting the SS-TDMA-spread-spectrum signal before transmitting.

At the receiver, as shown in FIG. 2, the translating means is shown as a translating device 62 with oscillator 63 and frequency locked loop 70. The translating device 62 is coupled through an antenna 61 to the communications channel and through an amplifier 64 to the header-matched filter 79. The translating device 62 is coupled to oscillator 63, and the oscillator 63 is coupled to frequency locked loop 70. The header-matched filter 79 is coupled to frequency locked loop 70. The processor 90 is coupled to the header-matched filter 79. The plurality of data-matched filters 71, 78 is coupled between the translating device 62 and the multiplexer 80. The receiver TDMA subsystem 81 is coupled between the multiplexer 80 and the receiver-FIFO memory 82.

The translating device 62 translates the received SS-TDMA-spread-spectrum signal from the carrier frequency to a processing frequency. The translating device 62 may be a mixer, which is well known in the art, for shifting an information signal, which in this disclosure is the received SS-TDMA-spread-spectrum signal, modulated at a carrier frequency to IF or baseband. The processing frequency may be RF, IF, at baseband frequency or other desired frequency for a digital signal processor. The signal for shifting the received SS-TDMA-spread-spectrum signal is produced by oscillator 63.

The header-detection means is embodied as a header-matched filter 79. The header-matched filter 79 detects, at the processing frequency, the header embedded in the SS-TDMA-spread-spectrum signal. The term "header-matched filter" as used herein, is a matched filter for detecting the header, by having an impulse response matched to the chip-sequence signal of the header of the SS-TDMA-spread-spectrum signal. The header-matched filter may be a digital-matched filter, a surface-acoustic-wave (SAW) device, software operating in a processor or embodied within an application specific integrated circuit (ASIC). In response to detecting the header, the header-matched filter 79 outputs a header-detection signal. The header-matched filter at a base station can detect the header embedded in the SS-TDMA-spread-spectrum signal from all users, since the chip-sequence signal for the header and data is common to all users.

The header-detection means alternatively may be embodied as a header-matched filter, coupled to an output of a data-matched filter or to the output of the multiplexer 80. This alternative is taught in U.S. Pat. No. 5,627,855, entitled PROGRAMMABLE TWO-PART MATCHED FILTER FOR SPREAD SPECTRUM by Davidovici, which is incorporated herein by reference.

The frequency locked loop 70 is frequency locked in response to the header-detection signal. The frequency locked loop 70 locks the frequency of the oscillator 63 to the carrier frequency of the received SS-TDMA-spread-spectrum signal. Circuits for frequency locked loops, and their operation, are well known in the art.

The processor means is embodied as a processor 90. The processor 90, in response to the header-detection signal, generates control and timing signals. The control and timing signals are used for controlling sequences and timing of the invention.

The receiver-spread-spectrum means is embodied as a plurality of data-matched filters 71, 78. Each of the plurality of data-matched filters 71, 78 has an impulse response matched to a chip-sequence signal of a respective one of the plurality of chip-sequence signals. The data-matched filters may be embodied as a digital-matched filter, SAW device, software operating in a processor, or an ASIC. The plurality of data-matched filters 71–78 despreads the multichannel-spread-spectrum signal of the SS-TDMA-spread-spectrum signal as the plurality of received spread-spectrum channels.

Alternatively, the receiver-spread-spectrum means and the transmitter-spread-spectrum means may be embodied as the plurality of data-matched filters 71, 78, thereby using the same hardware. The plurality of data-matched filters 71, 78 in this embodiment are time multiplexed with different coefficients, between transmit and receive.

Each chip-sequence signal in the plurality of chip-sequence signals is different, preferably orthogonal to each other, to avoid or reduce interference. The plurality of chip-sequence signals, however, preferably is common to all users. Thus, the plurality of data-matched filters 71, 78 can detect the plurality of chip-sequence signals from any of the users.

The multiplexing means is embodied as a multiplexer 80 and the decoding means is embodied as a receiver TDMA subsystem 81. The multiplexer 80 multiplexes the plurality of received spread-spectrum channels as the received-TDMA data. The received-TDMA data, in an error-free environment, is the same as the TDMA data that was generated at the SS-TDMA transmitter.

The receiver TDMA subsystem 81 selects the received-TDMA data within a particular time slot, and outputs the received-TDMA data as received data. The selecting the received-TDMA data within a particular time slot by the receiver TDMA subsystem 81, is what distinguished one user from another, since each user transmits TDMA data with a different time slot from the other users. For example, a first user and a second user may send first data and second data, respectively, using a first sequence of time slots and a second sequence of time slots, which are different from, and non-interfering with, each other, just like regular TDMA.

A Costas loop is not required to lock onto phase, if the time slot is, by way of example, 80 to 160 microseconds and phase is constant. Thus, at a base station, the uplinks from the users assume that within a time slot phase does not change, even though ten milliseconds later, in a subsequent packet, phase can be different from a previous packet. The phase is assumed to not change only within a packet. The phase in the subsequent packet can be different.

The receiver-memory means is embodied as a receiver-first-in-first-out (receiver-FIFO) memory 82. The presence of data, which would be detected by the presence of a correct data sequence in the header or data portion of the SS-TDMA signal, would pass to the receiver-FIFO memory 82. A correct data sequence might be a particular combination of bits, indicating proper decoding. The receiver-FIFO memory 82 stores the received data and has the data present at an output.

The present invention also comprises a method. The method includes the steps of storing data in a memory and sending the data from the memory, in an assigned time slot, as TDMA data. The data are demultiplexed using a demultiplexer, into sub-data sequence signals. The method includes generating a plurality of chip-sequence signals, and multiplying each of the sub-data-sequence signals by a respective chip-sequence signal, thereby generating a plurality of spread-spectrum channels.

The steps include algebraically combining the plurality of spread-spectrum channels as a multichannel-spread-spectrum signal, concatenating a header to the multichannel-spread-spectrum signal to generate a SS-TDMA-spread-spectrum signal, and transmitting on a carrier frequency the SS-TDMA-spread-spectrum signal over a communications channel using radio waves.

The steps include, at a SS-TDMA receiver, translating the SS-TDMA-spread-spectrum signal from the carrier frequency to a processing frequency, and detecting, at the processing frequency, the header embedded in the SS-TDMA-spread-spectrum signal. The chip-sequence signal used for the header and the data is common to all uses. In response to detecting the header, the method includes outputting a header-detection signal and generating control and timing signals.

The steps also include despreading the multichannel-spread-spectrum signal of the SS-TDMA-spread-spectrum signal as a plurality of received spread-spectrum channels.

The plurality of received spread-spectrum channels are multiplexed as received-TDMA data. The steps include selecting within a time slot of a sequence of time slots, the received-TDMA data as received data, and storing the received data in a memory for output to a data output.

The SS-TDMA system can be a wideband code division multiple access (W-CDMA) system, capable of transmitting, in a particular application, 9.6 megabits per second of data. For example, the following discussion assumes operation in the frequency band 2.4–2.483 GHz, although operation in other bands is possible. Preferred bandwidths are 26 MHz, available in Japan, and 70 MHz, for operation in U.S.A., but again other bandwidths are possible. For example, IMT-2000 is considering bandwidths of 2×5, 2×10, 2×20 and probably 2×40 MHz.

In order to achieve a high processing gain at these bandwidths the data are demultiplexed. In FIG. 2, 19.2 megachips per second and a demultiplex factor of eight is employed for 26 MHz bandwidth operation.

The circuit operation of FIG. 2 is as follows:

1. The data are entered mechanically or electrically into a transmitter-FIFO memory 41 and read out at a 9.6 megabits per second rate.
2. The data are sent by transmitter TDMA subsystem 42. Such techniques for generating TDMA data in a TDMA system are well known in the art. Each user has a different time slot. The TDMA data are demultiplexed into eight, 9.6/8=1.2 megabits per second sub-data-sequence signals.
3. Each bit is spread using a 16 chip/bit code. The chip-sequence signals $C_i$–$C_8$ are each orthogonal to one another, i.e., $C_i \cdot C_j = 0$, $i \neq j$.

Obtaining orthogonal chip-sequence signals is well known. In a preferred embodiment, the standard procedure of taking a chip-sequence signal of length 15 is used and called g(i); the chip-sequence signal is shifted by n=1, 2, ..., 15 to yield the chip-sequence signals g(i–n) n=1, ..., 15. Each chip-sequence signal is of length 15 chips. Each chip-sequence signal is then increased by one chip by adding a zero chip as the last chip. Thus the chip-sequence signal g(i–n) contains 16 chips and chip-sequence signals for different n are orthogonal.

4. The sub-data-sequence signals, i.e., the multichannel-spread-spectrum signal, are concatenated with a header by a header device 46. In this example the header is a chip-sequence signal, 3,360 chips long.
5. Each user has the same header and the same set of spreading chip-sequence signals.
6. The number of chips/bit can be any number e.g., 4, 8, 16, 32. The key is that different chip-sequence signals, $C_i \cdot C_j$, are orthogonal. This enhances processing gain (PG) for increased interference immunity.

In other systems, only one user can transmit at a time and, if two users transmitted simultaneously, a collision may occur and SS-TDMA signals from both users will not be received correctly.

Clearly, two or three or more simultaneous transmissions depend only on the processing gain which is a design parameter and not fundamental to the present invention.

7. The spread data is upconverted and amplified by transmitter-carrier subsystem 50 and transmitted.

The received signal is amplified in a low noise amplifier (LNA) 61 and down-converted, by mixer 62 with a signal from a local oscillator 63, to baseband. The signal is then amplified by amplifier 64 and hard limited by a hard limiter. The amplifier 64 may include the hard limiter.

8. The received signal is detected by the header-matched filter 79 and then by the plurality of data-matched filters 71, 78. The output of the header-matched filter 79 goes to the frequency locked loop (FLL) 70 to control the frequency. The frequency locked loop 70 design is standard as is known in the art. Analog designs also are possible.
9. The despread data are then multiplexed by multiplexer 80 and decoded by receiver TDMA subsystem 81.
10. Forward error correction (FEC) is not shown but can be employed.
11. The data can be stored in a receiver-FIFO memory 82 before outputting.
12. To minimize collisions, each receiver can read the matched filter output power using a signal power detector 87. When the power is low the user can transmit. When the power level is high, transmission is stopped.
13. The processor 90 handles all control and timing functions.
14. Matched filter acquisition and tracking are not shown for simplicity since techniques for these functions are well known in the art.

QAM SS-TDMA System

The present invention also provides a new and novel spread-spectrum, SS-TDMA system, using a quadrature-amplitude-modulated (QAM) spread-spectrum signal. The QAM-spread-spectrum signal, in a preferred embodiment, includes a first header, followed in time by a first multichannel-spread-spectrum signal, and a second header, followed in time by a second multichannel-spread-spectrum signal. The first and second headers are concatenated with the first and second multichannel-spread-spectrum signals, respectively. The first and second headers are generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user-defined, and in a usual practice, is used with a header-symbol-sequence signal. The header, in a preferred embodiment, is a chip-sequence signal used for the purpose of synchronization.

Each spread-spectrum channel of the first and second multichannel-spread-spectrum signals part of the QAM-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user-defined, and preferably is orthogonal to other chip-sequence signals used for generating the plurality of spread-spectrum channels.

In the QAM SS-TDMA system, each SS-TDMA transmitter includes transmitter-memory means, transmitter TDMA means, demultiplexer means, transmitter-spread-spectrum means, combiner means, header means, and transmitter-carrier means. The transmitter TDMA means is coupled to the transmitter-memory means. The demultiplexer means, which is coupled to the transmitter TDMA means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The transmitter TDMA means sends the data, within an assigned time slot, from the transmitter-memory means as TDMA data. The demultiplexer means demultiplexes the TDMA data into a first plurality of sub-data-sequence signals and a second plurality of sub-data-sequence signals, with a respective sub-data-sequence signal at a respective output of the demultiplexer means. The transmitter-spread-spectrum means spread-spectrum processes each of the first plurality of sub-data-sequence signals, and each of the second plurality of sub-data-sequence signals, with a respective chip-sequence signal. The output of the transmitter-spread-spectrum means is a first plurality of spread-spectrum channels and a second plurality of spread-spectrum channels, with each spread-spectrum channel corresponding to one of the outputs of the demultiplexer means. The combiner means algebraically combines the first plurality of spread-spectrum channels as a first multichannel-spread-spectrum signal, and the second plurality of spread-spectrum channels as a second multichannel spread-spectrum signal. The header means concatenates a first header to the first multichannel-spread-spectrum signal, and a second header to the second multichannel spread-spectrum signal. The first header and the second header are for chip-sequence synchronization. At the output of the header means is a first SS-TDMA-spread-spectrum signal and a second SS-TDMA-spread-spectrum signal. The transmitter-carrier means transmits, at a carrier frequency, the QAM-spread-spectrum signal, using radio waves, over a communications channel.

Each of the SS-TDMA receivers includes translating means, header-detection means, processor means, receiver-spread-spectrum means, multiplexing means, receiver TDMA means, and receiver-memory means. The translating means is coupled to the communications channel. The header-detection means is coupled between the receiver-spread-spectrum means and the processor means. The receiver-spread-spectrum means is coupled to the translating means and to the multiplexing means. The receiver TDMA means is coupled between the multiplexing means and the receiver-memory means. At the output of the receiver-memory means are the received data.

The translating means translates the received QAM-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the first header and the second header embedded in the QAM-spread-spectrum signal. The header-detection means outputs, in response to detecting the first header and/or the second header, a header-detection signal.

The processor means generates control and timing signals. These signals are used for controlling sequences and timing of the invention.

The receiver-spread-spectrum means despreads the first multichannel spread-spectrum signal and the second multichannel spread-spectrum signal embedded in the QAM-spread-spectrum signal, as a first plurality of spread-spectrum signals and a second plurality of spread-spectrum signals. The multiplexing means multiplexes the first plurality of spread-spectrum signals and the second plurality of spread-spectrum signals as the received-TDMA data. The receiver TDMA means selects from a particular time slot the received-TDMA data and the receiver memory means stores the received-TDMA data from the receiver TDMA means and outputs the data.

Figure 3:
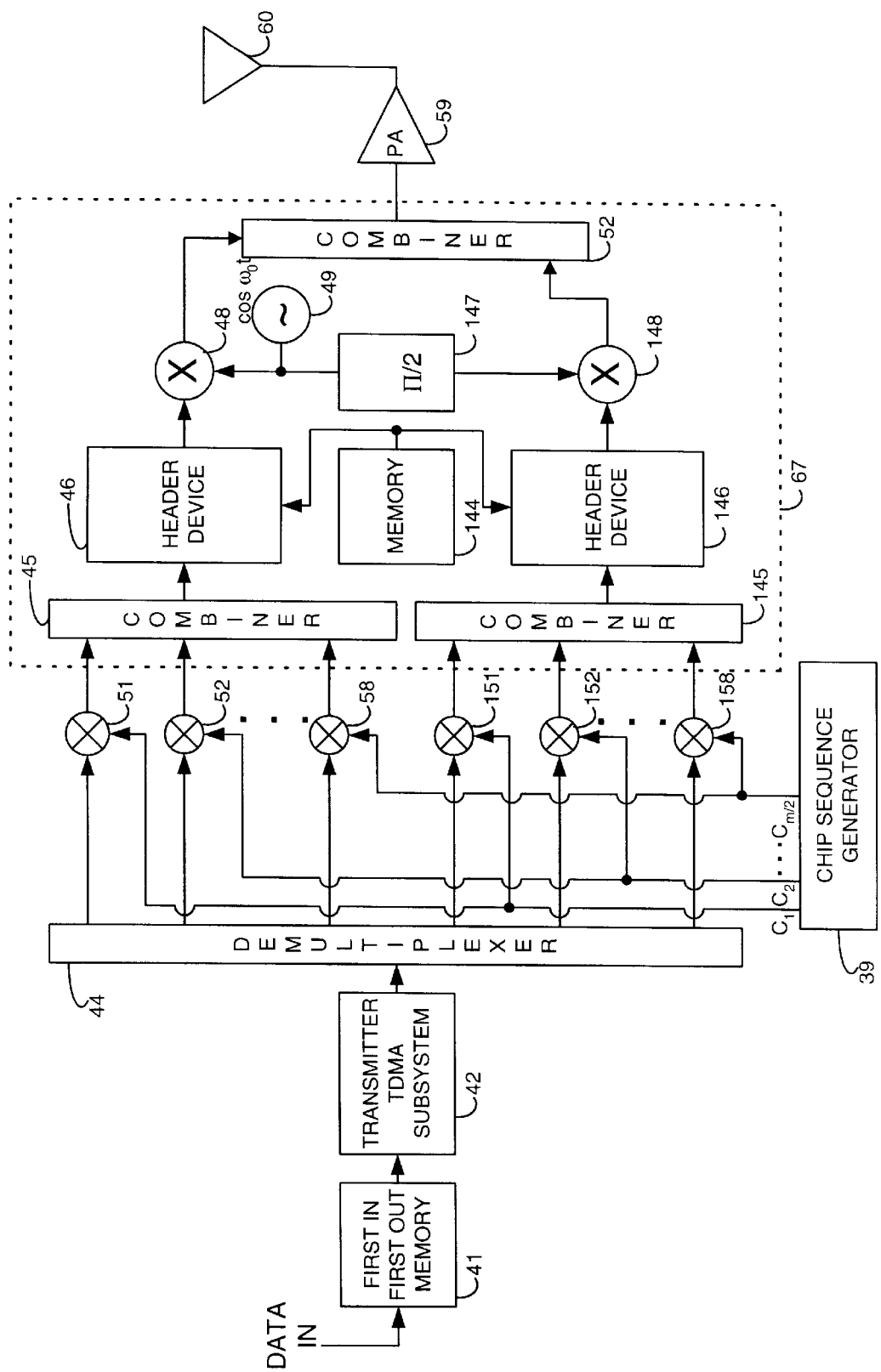
FIG. 3 is a block diagram of a SS-TDMA transmitter.

In the exemplary arrangement shown in FIG. 3, the transmitter-memory means is embodied as a transmitter-first-in-first-out (transmitter-FIFO) memory 41. The transmitter-FIFO memory 41 may employ random access memory (RAM) or other memory components as is well known in the art. The transmitter-FIFO memory 41 may be part of a digital signal processor (DSP); or, part of an application specific integrated circuit (ASIC).

For the case of an analog signal, an analog-to-digital converter would be inserted before the input to the transmitter-FIFO memory 41 for converting the analog signal to data. The analog-to-digital converter may convert an analog signal to one of a multilevel value, or may be a one bit analog-to-digital converter, i.e., a hard limiter.

The transmitter TDMA means is embodied as a transmitter TDMA subsystem 42. The transmitter TDMA subsystem 42 may be a TDMA circuit or device for transmitting data within a time slot of a TDMA system. Circuitry for TDMA subsystems are well known in the art for transmitting TDMA data.

The transmitter TDMA subsystem 42 sends the data from the transmitter-FIFO memory 41, as TDMA data. The TDMA process may include sending data within a particular time slot of a sequence time slot, as TDMA data, a particular data channel. The term "TDMA data," as used herein, broadly means data that are sent in a time slot of a transmitter TDMA system. The time slots of the TDMA data serve to distinguish a first QAM-spread-spectrum signal from a second QAM-spread-spectrum signal, by having the first QAM-spread-spectrum signal in a first time slot, and the second QAM-spread-spectrum signal in a second time slot.

The demultiplexing means is embodied as a demultiplexer 44. The demultiplexer 44 may be embodied as a serial-to-parallel converter. The outputs of the demultiplexer 44 are divided into a first plurality of outputs and a second plurality of outputs. Each output of the demultiplexer 44 has a demultiplexed portion of the encoded signal. As an example, the first plurality of outputs might include 64 outputs, and the second plurality of outputs might include 64 outputs.

The transmitter-spread-spectrum means is embodied as a chip-sequence means and a first plurality of product devices 51, 52, 58 and a second plurality of product devices 151, 152, 158. The chip-sequence means may be embodied as a chip-sequence generator 39 for generating a plurality of chip-sequence signals.

Alternatively, the transmitter-spread-spectrum means may be embodied as a plurality of EXCLUSIVE-OR gates, coupled between the plurality of outputs of the demultiplexer 44, and a memory device for storing the plurality of chip-sequence signals. In this embodiment, the memory device outputs a respective chip-sequence signal in response to the respective sub-data-sequence signal.

A third alternative may include having the transmitter-spread-spectrum means embodied as a memory device, with an appropriate detection circuit, so that in response to a particular data symbol or data bit at the output of a particular output of the demultiplexer, a chip-sequence signal is substituted for that data symbol or data bit. The transmitterspread-spectrum means may also be embodied as other technology known in the art capable of outputting a plurality of chip-sequence signals.

The combining means is embodied as a first combiner 45 and a second combiner 145, the header means is embodied as a first header device 46 for concatenating a first header with a first multichannel-spread-spectrum signal and a second header device 146 for concatenating a second header with a second multichannel-spread-spectrum signal, and the transmitter-carrier means is embodied as a transmitter-carrier subsystem. A memory 144 may store the header used by first header device 46 and second header device 146. A memory for storing the header may be included as part of the first header device 46 and the second header device 146. Alternatively, a shift register with appropriate taps may generate the header, as is well known in the art.

The transmitter-carrier subsystem may include an oscillator 49 and in-phase multiplier device 48 for shifting a first multichannel-spread-spectrum signal to a carrier frequency, a quadrature-phase multiplier device 148 coupled through a 90° phase shift device 147 to the oscillator 49 for shifting a second multichannel-spread-spectrum signal to a carrier frequency, a combiner 52 and a power amplifier 59 and/or other circuitry as is well known in the art for transmitting a signal over a communications channel. The QAM-spread-spectrum signal is transmitted using an antenna 60. The QAM modulator 67 comprises the elements within the dashed lines.

As shown in FIG. 3, the transmitter TDMA subsystem 42 is coupled between the transmitter-FIFO memory 41 and the demultiplexer 44. The chip-sequence generator 39 is coupled to the first plurality of product devices 51, 52, 58, and to the second plurality of product devices 151, 152, 158. The first combiner 45 is coupled between the first plurality of product devices 51, 52, 58 and the first header device 46, and the first header device 46 is coupled to the in-phase multiplier device 48. The second combiner 145 is coupled between the second plurality of product devices 151, 152, 158 and the second header device 146, and the second header device 146 is coupled to the quadrature-phase multiplier device 148.

The transmitter-FIFO memory 41 receives data from a data input, and stores the data. The first data stored in the transmitter-FIFO memory 41 are the first data outputted from the transmitter-FIFO memory 41.

The transmitter TDMA subsystem 42 sends the data from the transmitter-FIFO 41 as TDMA data. The transmitter TDMA subsystem 42 sends the data in a particular time slot.

The transmitter TDMA subsystem 42 is necessary for distinguishing data from different users. By having the proper time slot for receiving the TDMA data, data from a particular user are distinguished from data from other users. Thus, the use of different time slots in the TDMA subsystem is what defines a user's channel, unlike other multichannel spread-spectrum systems, where a user's channel is defined by a particular chip-sequence signal. By sending the data with transmitter TDMA subsystem 42, a common set of chip-sequence signals can be used by all users for the CDMA subsystem, reducing the cost of having matched filters or correlators changing to different chip-sequence signals. The reduced cost is achieved since, at a receiver, different sets of matched-filters or correlators are not required for each user but instead one set of matched filters or correlators is required for despreading the multichannel-spread-spectrum signal from all users.

The demultiplexer 44 demultiplexes the TDMA data into a first plurality of sub-data-sequence signals and a second plurality of sub-data-sequence signals, with a respective sub-data-sequence signal at a respective output of the demultiplexer 44. Typically, the number of the first plurality of sub-data-sequence signals are half of the total number of data-sequence signals outputted from the demultiplexer 44, and the second plurality of sub-data-sequence signals are the other half of the data-sequence signals outputted from the demultiplexer 44.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The chip sequences used for data spreading are not necessarily pseudonoise sequences. The chip sequences may be derived from the Gold codes, pseudonoise sequences, quadrature residue codes, etc. In order to make the Gold code, etc., orthogonal, each shift of the original Gold code is augmented with a 1. Walsh functions are not preferred because they repeat.

In FIG. 3, the first plurality of product devices 51, 52, 58, and the second plurality of product devices 151, 152, 158, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The first plurality of product devices 51, 52, 58 multiplies each of the first plurality of sub-data-sequence signals by a respective chip-sequence signal from chip-sequence generator 39. At the output of the first plurality of product devices 51, 52, 58 is a first plurality of spread-spectrum channels, respectively. The second plurality of product devices 151, 152, 158 multiplies each of the second plurality of sub-data-sequence signals by a respective chip-sequence signal from chip-sequence generator 39. At the output of the second plurality of product devices 151, 152, 158 is a second plurality of spread-spectrum channels, respectively. A particular spread-spectrum channel is identified by the chip-sequence signal that was used to spread-spectrum process the particular sub-data sequence signal. The plurality of chip-sequence signals used to multiply the first plurality of sub-data-sequence signals may be used to multiply the second plurality of sub-data-sequence signals. Alternatively, a first plurality of chip-sequence signals may be used to multiply the first plurality of sub-data-sequence signal, and a second plurality of chip-sequence signals may be used to multiply the second plurality of sub-data-sequence signals, with the first plurality of chip-sequence signals different from the second plurality of chip sequence signals.

The first combiner 45 algebraically combines the first plurality of spread-spectrum channels, and outputs the combined signal as a first multichannel-spread-spectrum signal. Preferably, the first combiner 45 combines the first plurality of spread-spectrum channels linearly, although some non-linear process may be involved without significant degradation in system performance.

The second combiner 145 algebraically combines the second plurality of spread-spectrum channels, and outputs the combined signal as a second multichannel-spread-spectrum signal. Preferably, the second combiner 145 combines the first plurality of spread-spectrum channels linearly, although some nonlinear process may be involved without significant degradation in system performance.

The first header device 46 concatenates a first header to the first multichannel-spread-spectrum signal. At the output of the first header device 46 is the first SS-TDMA-spread-spectrum signal. The first header is for chip-sequence synchronization at the receiver.

The second header device 146 concatenates a second header to the second multichannel-spread-spectrum signal. At the output of the second header device 146 is the second SS-TDMA-spread-spectrum signal. The second header is for chip-sequence synchronization at the receiver.

The in-phase multiplier device 48 shifts the first SS-TDMA-spread-spectrum signal to a carrier frequency, as an in-phase component of the carrier frequency. The quadrature-phase multiplier device 148 shifts the second SS-TDMA-spread-spectrum signal to the carrier frequency, as a quadrature-phase component.

The combiner 52 combines the first SS-TDMA-spread-spectrum signal, as the in-phase component, and the second SS-TDMA-spread-spectrum signal, as the quadrature-phase component, to generate a QAM-spread-spectrum signal. The transmitter transmits, at the carrier frequency, the QAM-spread-spectrum signal using radio waves over a communications channel. The transmitter-carrier subsystem of the SS-TDMA transmitter includes appropriate filters, power amplifiers 59 and matching circuits coupled to an antenna 60. The transmitter-carrier subsystem also may include a hard limiter, for hard limiting the SS-TDMA-spread-spectrum signal before transmitting.

Figure 4:
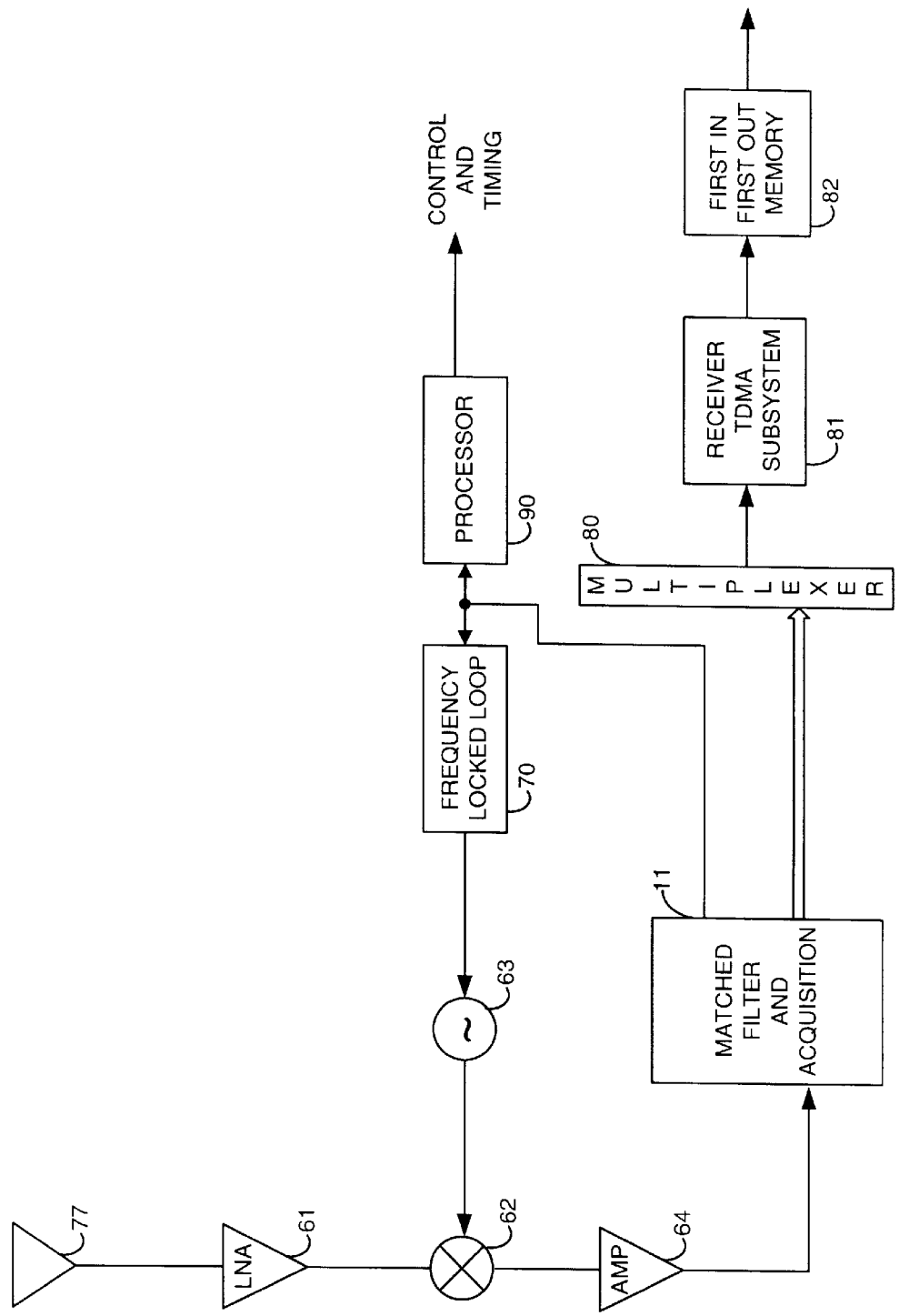
FIG. 4 is a block diagram of a SS-TDMA receiver.

At the receiver, as shown in FIG. 4, the translating means is shown as a translating device 62 with oscillator 63 and frequency locked loop 70, the header-detection means is embodied as a plurality of header-matched filters, which are within the matched-filter-and-acquisition subsystem 11. The header-detection means alternatively may be a header-matched filter 79 of FIG. 2, within the matched-filter-and-acquisitions subsystem 11. The processor means is embodied as a processor 90, the receiver-spread-spectrum means includes a plurality of data-matched filters, which are within the matched-filter-and-acquisition subsystem 11, the multiplexing means is embodied as a multiplexer 80 and the receiver TDMA means is embodied as a receiver TDMA subsystem 81. The receiver-memory means is embodied as a receiver-first-in-first-out (receiver-FIFO) memory 82.

The translating device 62 is coupled through an antenna 77 to the communications channel and through an amplifier 64 to the matched-filter-and-acquisition-subsystem 11. The translating device 62 is coupled to the oscillator 63, and the oscillator 63 is coupled to frequency locked loop 70. The plurality of header-matched filters within the matched-filter-and-acquisition subsystem 11 are coupled to the frequency locked loop 70. The processor 90 is coupled to the header-matched filters within the matched-filter-and-acquisition subsystem 11. The first and second pluralities of data-matched filters within the matched-filter-and-acquisition subsystem 11 are coupled between the translating device 62 and the multiplexer 80. The receiver TDMA subsystem 81 is coupled between the multiplexer 80 and the receiver-FIFO memory 82.

The translating device 62 translates the received QAM-spread-spectrum signal from the carrier frequency to a processing frequency. The translating device 62 may be a mixer, which is well known in the art, for shifting an information signal, which in this disclosure is the received QAM-spread-spectrum signal, modulated at a carrier frequency to IF or baseband. The processing frequency may be RF, IF, at baseband frequency or other desired frequency for a digital signal processor. The signal for shifting the received QAM-spread-spectrum signal is produced by the oscillator 63. The QAM-spread-spectrum signal is processed into an in-phase component and a quadrature-phase component.

Figure 5:
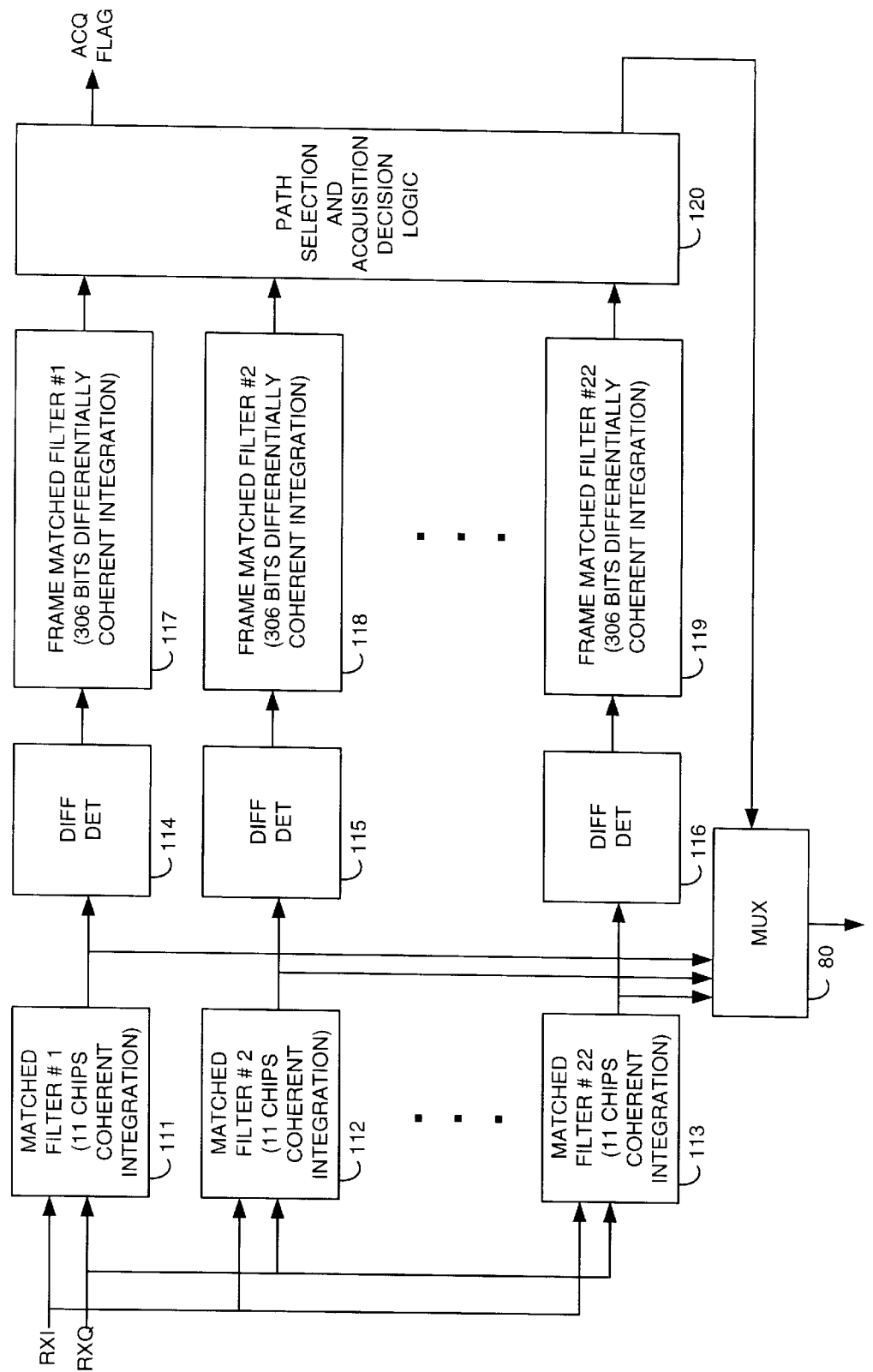
FIG. 5 is a block diagram of a matched-filter-and-acquisition subsystem as used in FIG. 4.

The matched-filter-and-acquisition circuit 11 may include a plurality of data-matched filters 111, 112, 113 and a plurality of header-matched-filter integrators 117, 118, 119, as shown in FIG. 5. The plurality of data-matched filters 111, 112, 113 is coupled through a plurality of differential detectors 114, 115, 116 to the plurality of header-matched-filter integrators 117, 118, 119, respectively. The plurality of header-matched-filter integrators 117, 118, 119 is coupled to path and acquisition decision logic 120. The outputs of the path and acquisition decision logic 120 and the plurality of data-matched filters 111, 112, 113 are coupled through a multiplexer 80. The plurality of data-matched filters 111, 112, 113 and the plurality of header-matched-filter integrators 117, 118, 119 include matched filters for the in-phase and quadrature-phase components of the QAM-spread-spectrum signal. The concept of a data-matched filter and a header-matched filter is taught in U.S. Pat. No. 5,627,855, entitled PROGRAMMABLE TWO-PART MATCHED FILTER FOR SPREAD SPECTRUM by Davidovici, which is incorporated herein by reference.

The plurality of data-matched filters 111, 112, 113 has a plurality of impulse responses, respectively matched to the plurality of chip-sequence signals generated by chip-sequence generator 39. The plurality of data-matched filters 111, 112, 113 may be embodied as a plurality of digital-matched filters, a plurality of SAW devices, software operating in a processor or an ASIC. The plurality of data-matched filters 111, 112, 113 detects, from the in-phase component, the first plurality of spread-spectrum channels embedded in the QAM-spread-spectrum channels embedded in the QAM-spread-spectrum signal. The detected first plurality of spread-spectrum channel is the first plurality of sub-data-sequence signals, respectively. The plurality of data-matched filters 111, 112, 113 detects, from the quadrature-phase component, the second plurality of spread-spectrum channels. The detected second plurality of spread-spectrum channels is the second plurality of sub-data-sequence signals, respectively. The first plurality of spread-spectrum channels are in the in-phase component of the QAM-spread-spectrum signal, and the second plurality of spread-spectrum channels are in the quadrature-phase component of the QAM-spread-spectrum signal, as described previously.

In FIG. 5, the plurality of header-matched-filter integrators 117, 118, 119 integrate and detect, at the processing frequency, the first header, from the in-phase component, and the second header, from the quadrature-phase component, embedded in the QAM-spread-spectrum signal. The header-matched-filter integrator can integrate and detect the first header and the second header embedded in the QAM-spread-spectrum signal from all users, since the chip-sequence signal and the bit signal for the first header and the second header and data is common to all users.

The term "header-matched-filter integrator," as used herein, is one or more matched-filter integrators for detecting the first header and the second header. The plurality of header-matched-filter integrators 117, 118, 119 may be embodied as a plurality of digital-matched-filter integrators, software operating in a processor, or an ASIC. In response to detecting the first header and the second header, the header-matched-filter integrator outputs a header-detection signal. Only one of the first header or the second header, however, needs to be detected to output the header-detection signal.

The path-selection-and-acquisition-decision logic 120 selects, and acquires lock, to a detected path of the QAM-spread-spectrum signal, from the plurality of header-matched-filter integrators 117, 118, 119, and outputs an acquisition signal. The acquisition signal passes through the multiplexer 80.

After acquisition of a packet, data are detected from the plurality of data-matched filters 111, 112, 113, and are outputted through multiplexer 80.

Figure 6:
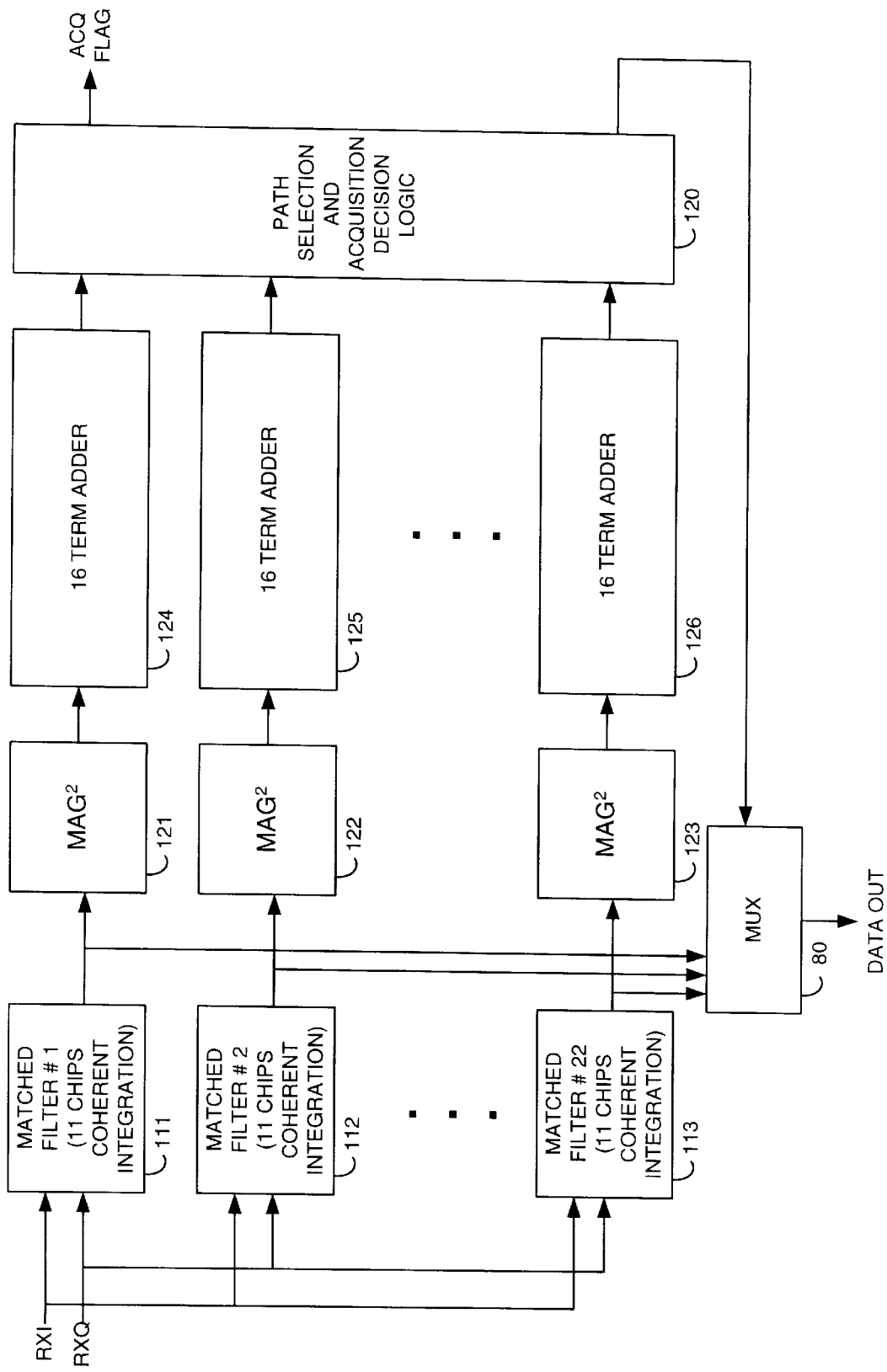
FIG. 6 is a block diagram of an alternative matched-filter-and-acquisition subsystem as used in FIG. 4.

An alternative for the matched-filter-and-acquisition circuit 11 is shown in FIG. 6. The plurality of data-matched filters 111, 112, 113 of FIG. 6 operates the same as those in FIG. 5. The plurality of header-matched-filter integrators 117, 118, 119 of FIG. 5, however, is replaced by a plurality of magnitude-square devices 121, 122, 123 connected to a plurality of adders 124, 125, 126, respectively. The plurality of magnitude-square devices 121, 122, 123 determine a magnitude square of each bit of the first header and the second header, and the plurality of adders 124, 125, 126 effectively add up, or integrate, the magnitude square of the bits of the first header and the second header. The path-selection-and-acquisition-decision logic 120 works as described in connection with FIG. 5.

The packet receiver of FIGS. 4 and 5 or 6 may be modified by using the differential detectors and the header-matched filter, as disclosed in FIG. 2. Similarly, the packet receiver of FIG. 2 may be modified by using the header-matched filter integrators disclosed in FIG. 5 or the magnitude-square devices and adders of FIG. 6.

The frequency locked loop 70 is frequency locked in response to the header-detection signal. The frequency locked loop 70 locks the frequency of the oscillator 63 to the carrier frequency of the received QAM-spread-spectrum signal. Circuits for frequency locked loops, and their operation, are well known in the art.

The processor 90, in response to the header-detection signal, generates control and timing signals. The control and timing signals are used for controlling sequences and timing of the invention.

Each chip-sequence signal in the plurality of chip-sequence signals is different, one from another. The plurality of chip-sequence signals, however, is common to all users. Thus, the plurality of data-matched filters 111, 112, 113 can detect the plurality of chip-sequence signals from any of the users.

The multiplexer 80 multiplexes the first plurality of received spread-spectrum channels and the second plurality of received spread-spectrum signals as the received-TDMA data. The received-TDMA data, in an error-free environment, is the same as the TDMA data that was generated at the SS-TDMA transmitter. The multiplexer 80 may be embodied as a parallel-to-serial converter.

The receiver TDMA subsystem 81 selects from a time slot, the received-TDMA data as the received data. The use of time slots is what distinguishes one user from another, since each user transmits with a different time slot from a sequence of time slots.

If the receiver TDMA subsystem 81 were set to receive with the first time slot, then the first data would appear at the output of receiver TDMA subsystem 81. Data in other time slots would not appear at the output of receiver TDMA subsystem 81. The presence of data in other time slots, would be rejected by the receiver TDMA subsystem 81. The presence of data within a first time slot, would pass to the receiver-FIFO memory 82. The receiver-FIFO memory 82 stores the received data and has the data present at an output.

The present invention has a matched filter based implementation that permits fast acquisition, can perform coherent as well as differentially coherent detection of the incoming data. The incoming data are either BPSK, QPSK, or QAM modulated. At the receiver the plurality of data-matched filters separates the individual components that are QAM signals.

The present invention incorporates a fast acting automatic gain control (AGC) circuit that ensures the analog-to-digital converter receives proper level signals. The AGC is adaptive; it can quickly adapt in actual operation to changes in signal levels and modulation formats.

In a preferred embodiment, the TDMA portion uses a frame having 128 time-slots. The frame lasts 10 milliseconds. Other time slots and frame durations are, of course, useable. The time slot may include a packet from a user. The packet, by way of example, may include a header, FEC coding, and maintenance information. Within a time slot, guard time is the transmission uncertainty due to near-far propagation delay considerations. Each packet contains 1536 bits, which are demultiplexed into 128 sub-data sequence signals, increasing processing gain to 64. Each sub-data-sequence signal has 12 bits, so that the entire packet has 12×128=1536 bits. During the guard time, there is no transmission.

Each of the 128 chip-sequence signals for spread-spectrum processing the 128 sub-data sequence signals, can be used by each of the users in each sector. A sector is a geographical area covered by a base station. In order to minimize cross-correlation interference between users of nearby sectors, each sector employs a second, long, pseudorandom sequence having in-phase and quadrature-phase components $C_1$ and $C_2$. The in-phase and quadrature-phase components of the pseudorandom sequence, $C_1$ and $C_2$, are different chip-sequence signals for different sectors.

The present invention also comprises a method. The method includes the steps of storing data in a memory and sending the data from the memory in an assigned time slot as TDMA data. The data are demultiplexed using a demultiplexer, into a first plurality of sub-data sequence signals and a second plurality of sub-data-sequence signals. The method includes generating a plurality of chip-sequence signals, and multiplying each of the first plurality of sub-data-sequence signals by a respective chip-sequence signal, thereby generating a first plurality of spread-spectrum channels. The method includes generating a plurality of chip-sequence signals, and multiplying each of the second plurality of sub-data-sequence signals by a respective chip-sequence signal, thereby generating a second plurality of spread-spectrum channels.

The steps include algebraically combining the first plurality of spread-spectrum channels as a first multichannel-spread-spectrum signal, and concatenating a first header to the first multichannel-spread-spectrum signal to generate a first SS-TDMA-spread-spectrum signal. The steps include algebraically combining the second plurality of spread-spectrum channels as a second multichannel-spread-spectrum signal, and concatenating a second header to the second multichannel-spread-spectrum signal to generate a second SS-TDMA-spread-spectrum signal. The steps include transmitting on a carrier frequency the first SS-TDMA-spread-spectrum signal and the second SS-TDMA-spread-spectrum signal as a QAM-spread-spectrum signal, over a communications channel using radio waves.

The steps include, at a SS-TDMA receiver, translating the QAM-spread-spectrum signal from the carrier frequency to a processing frequency, and detecting, at the processing frequency, the first header and second header embedded in the QAM-spread-spectrum signal. The chip-sequence signal used for the first header and the second header and the data is common to all users. In response to detecting the first header and the second header, the method includes outputting a header-detection signal and generating control and timing signals. The steps also include despreading the first multichannel-spread-spectrum signal of the QAM-spread-spectrum signal as a first plurality of received spread-spectrum channels. The steps also include despreading the second multichannel-spread-spectrum signal of the QAM-spread-spectrum signal as a second plurality of received spread-spectrum channels. The first plurality of received spread-spectrum channels and the second plurality of received spread-spectrum signals are multiplexed as received-TDMA data. The steps include selecting from a time slot the received-TDMA data as received data, and storing the received data in a memory for output to a data output.

In the present invention, assume that a 1536 bit packet is transmitted in one of 128 time slots at the rate of 7.3728 Mb/s. This signal is first demultiplexed, FIG. 3, into K channels, where K=128 in a preferred system, although any K will suffice. As a result, if K=128, and the chip rate is 9.8304 Mchips/s, then the transmitted rate in each channel is 153.6 kb/s and the processing gain is 64. Each of these K channels is spread using a different orthogonal spread-spectrum code of length L. Thus, $$\int_0^{T_L} C_i(t)C_j(t)dt = \begin{matrix} 1 & i=j \\ 0 & i \neq j \end{matrix}$$

over the time $T_L$ corresponding to the codelength L.

Further, the length L of each of the K orthogonal codes must be such that $L \geq K$, since there are only L orthogonal codes of length L.

In FIG. 3, one-half of the codes are sent on the in-phase (I) channel and one-half on the quadrature-phase (Q) channel forming quadrature-phase-shift-keying modulation (QPSK) or OQPAK. Binary-phase-shift-keying modulation (BPSK) can also be used. These are standard modulation procedures well known in the prior art.

Different sectors and different cells should use different orthogonal chip sequences to minimize interference between sectors and cells. This is done by multiplying each chip sequence $C_i$ by a chip sequence $g_j(t)$. Within a sector, every user uses the same codeset $C_i$ and $g_j$. Within each sector of each cell, each user uses the same codeset $C_i$ but, each sector in each cell gets a different $g_j$.

Users transmitting at different rates use a subset of one or more time slots so that the processing gain remains a constant. A random packet may be sent during any empty time slot. The availability of the empty slots are broadcast by the base station to the remote units, in an signaling or overhead channel.

It will be apparent to those skilled in the art that various modifications can be made to the high processing gain TDMA/CDMA system and method of the instant invention without departing from the scope or spirit of the invention, and it is intended that the present invention cover modifications and variations of the high processing gain TDMA/CDMA system and method provided they come within the scope of the appended claims and their equivalents.

We claim:

1. A spread-spectrum time-division-multiple-access (SS-TDMA) system for communicating data, comprising:

a plurality of SS-TDMA transmitters, each SS-TDMA transmitter including, a transmitter-first-in-first-out (transmitter-FIFO) memory, coupled to a data input, for storing data;

a transmitter TDMA subsystem, coupled to said transmitter-FIFO memory, for sending the data in a time slot, with the time slot different from time slots used by each of the other SS-TDMA transmitters in the plurality of SS-TDMA transmitters, from said transmitter-FIFO memory as TDMA data;

a demultiplexer, coupled to said transmitter TDMA subsystem and having a plurality of outputs, for demultiplexing the TDMA data into a first plurality of sub-data-sequence signals and into a second plurality of sub-data-sequence signals chip-sequence means for outputting a plurality of chip-sequence signals, with each chip-sequence signal orthogonal to the other chip-sequence signals in said plurality of chip-sequence signals;

a first plurality of product devices, coupled to said demultiplexer and to said chip-sequence means, for multiplying each sub-data-sequence signal of the first plurality of sub-data-sequence signals by a respective chip-sequence signal of the plurality of chip-sequence signals, respectively, thereby generating a first plurality of spread-spectrum channels;

a second plurality of product devices, coupled to said demultiplexer and to said chip-sequence means, for multiplying each sub-data-sequence signal of the second plurality of the sub-data-sequence signals, by a chip-sequence signal of the plurality of chip-sequence signals, respectively, thereby generating a second plurality of spread-spectrum channels;

a first combiner, coupled to the first plurality of product devices, for algebraically combining the first plurality of spread-spectrum channels as a first multichannel-spread-spectrum signal;

a first header device, coupled to first said combiner, for concatenating a first header for chip-sequence sequence synchronization, to the first multichannel-spread-spectrum signal, thereby generating a first time/code division multiple access (SS-TDMA) signal;

a second combiner, coupled to the second plurality of product devices, for algebraically combining the second plurality of spread-spectrum channels as a second multichannel-spread-spectrum signal;

a second header device, coupled to said second combiner, for concatenating a second header for chip-sequence synchronization, to the second multichannel-spread-spectrum signal thereby generating a second SS-TDMA signal; and a transmitter-carrier subsystem, coupled to said first header device and to said second header device, for transmitting on a carrier frequency the first SS-TDMA signal and the second SS-TDMA signal, as a quadrature-amplitude modulated (QAM) SS-TDMA signal using radio waves over a communications channel; and a plurality of SS-TDMA receivers, each SS-TDMA receiver including, a translating device, coupled to the communications channel, for translating the SS-TDMA signal from the carrier frequency to a processing frequency;

a header-matched filter, coupled to said translating device and having an impulse response matched to the header, for detecting, at the processing frequency, the header in the SS-TDMA signal, and for outputting, responsive to detecting the header, a header-detection signal;

a receiver processor, coupled to said header-matched filter, responsive to the header-detection signal, for generating control and timing signals;

a plurality of data-matched filters, coupled to said translating device, with each data-matched filter having an impulse response matched to a chip-sequence signal of the plurality of chip-sequence signals, respectively, for despreading the first and second multichannel-spread-spectrum signals embedded in the SS-TDMA signal as a plurality of received spread-spectrum channels, respectively;

a multiplexer, coupled to said plurality of data-matched filters, for multiplexing the plurality of received spread-spectrum channels as received-TDMA data;

a receiver-TDMA subsystem, coupled to said receiver processor and responsive to the control and timing signals, for selecting the received TDMA data from a particular time slot as received data; and a receiver-FIFO memory, coupled to said receiver TDMA subsystem, for storing the received data, and for outputting the received data to a data output.

2. The SS-TDMA system as set forth in claim 1, with said chip-sequence means including a chip-sequence generator for generating the plurality of chip-sequence signals.

3. The SS-TDMA system as set forth in claim 1, with said chip-sequence means including a memory for storing the plurality of chip-sequence signals.

4. A spread-spectrum time-division-multiple-access (SS-TDMA) system for communicating data, comprising:

a plurality of SS-TDMA transmitters, each SS-TDMA transmitter including, transmitter-memory means, coupled to a data input, for storing data;

transmitter TDMA means, coupled to said transmitter-memory means, for sending the data from said transmitter-memory means in an assigned time slot as TDMA data, with the time slot of the TDMA data from each of the plurality of SS-TDMA transmitters occurring at different times from time slots of TDMA data from other SS-TDMA transmitters in said plurality of SS-TDMA transmitters;

demultiplexer means, coupled to said transmitter TDMA means and having a first plurality of outputs and a second plurality of outputs, for demultiplexing the TDMA data into a first plurality of sub-data-sequence signals and a second plurality of sub-data-sequence signals, with a respective sub-data-sequence signal at a respective output of said demultiplexer means;

transmitter-spread-spectrum means, coupled to the plurality of outputs of said demultiplexer means, for spread-spectrum processing each sub-data-sequence signal of the first plurality sub-data-sequence signals by a chip-sequence signal of a plurality of chip-sequence sequence signals, thereby generating a first plurality of spread-spectrum channels, and for spread-spectrum processing each sub-data-sequence signal of the second plurality sub-data-sequence signals by a chip-sequence signal of the plurality of chip-sequence signals, thereby generating a second plurality of spread-spectrum channels, with each respective chip-sequence signal of the plurality of chip-sequence signals different from other chip-sequence signals in the plurality of chip-sequence signals;

combiner means, coupled to said transmitter-spread-spectrum means, for algebraically combining the first plurality of spread-spectrum channels as a first multichannel-spread-spectrum signal, and for algebraically combining the second plurality of spread-spectrum channels as a second multichannel-spread-spectrum signal;

header means, coupled to said combiner means, for adding a header for chip-sequence synchronization, to the first multichannel-spread-spectrum signal, thereby generating a first time/code-division-multiple-access (SS-TDMA) signal, and for adding a header for chip-sequence synchronization, to the second multichannel-spread-spectrum signal, thereby generating a second time/code-division-multiple-access (SS-TDMA) signal; and transmitter-carrier means, coupled to said header means, for transmitting at a carrier frequency the first SS-TDMA signal and the second SS-TDMA signal using radio waves over a communications channel; and a plurality of SS-TDMA receivers, each SS-TDMA receiver including, header-detection means, coupled to said communications channel, and including a first header-matched filter having an impulse response matched to the first header and a second header-matched filter having an impulse response matched to the second header, for detecting the header in the SS-TDMA signal, and for outputting, responsive to detecting the header, a header-detection signal;

receiver-spread-spectrum means, coupled to said header-detection means, for despreading the first and second multichannel-spread-spectrum signal embedded in the SS-TDMA signal as a plurality of received spread-spectrum channels, respectively;

multiplexing means, coupled to said receiver-spread-spectrum means, for multiplexing the plurality of received spread-spectrum channels as received-TDMA data;

receiver-TDMA means, coupled to said multiplexing means, for selecting the received-TDMA data from a particular time slot as received data; and receiver-memory means, coupled to said receiver-TDMA means, for storing the received data, and for outputting the received data to a data output.

5. The SS-TDMA system as set forth in claim 4, further including translating means, coupled between the communications channel and the header-detection means, for translating the SS-TDMA signal from the carrier frequency to a processing frequency.

6. The SS-TDMA system as set forth in claim 4, further including processor means, coupled to said header-detection means, responsive to the header-detection signal, for generating control and timing signals.

7. The SS-TDMA system as set forth in claim 4, 5 or 6 with said transmitter-spread-spectrum means including:

generating means for generating the plurality of chip-sequence signals; and a plurality of EXCLUSIVE-OR gates coupled between said demultiplexing means, said combiner means and said generating means, for multiplying the plurality of sub-data-sequence signals by the plurality of chip-sequence signals, respectively, thereby generating the plurality of spread-spectrum channels.

8. The SS-TDMA system as set forth in claim 4, 5 or 6 with said transmitter-spread-spectrum means including a memory for storing the plurality of chip-sequence signals.

9. The SS-TDMA system as set forth in claim 4, 5 or 6 with said transmitter-spread-spectrum means including a plurality of product devices for multiplying each of the sub-data-sequence signals by a respective chip-sequence signal of the plurality of chip sequence signals.

10. The SS-TDMA system as set forth in claim 4, 5 or 6 with said transmitter-spread-spectrum means including a plurality of matched filters, with each matched filter having an impulse response matched to a chip-sequence signal of the plurality of chip-sequence signals, respectively.

11. The SS-TDMA system as set forth in claim 4, 5 or 6 with said transmitter-spread-spectrum means including a plurality of surface-acoustic-wave devices, with each surface-acoustic-wave device having an impulse response matched to a chip-sequence signal of the plurality of chip-sequence signals, respectively.

12. A spread-spectrum time-division-multiple-access (SS-TDMA) system for communicating data, comprising:

a plurality of SS-TDMA transmitters, each SS-TDMA transmitter including,
  a transmitter-first-in-first-out (transmitter-FIFO) memory, coupled to a data input, for storing data;
  a transmitter TDMA subsystem, coupled to said transmitter-FIFO memory, for sending the data in a time slot, with the time slot different from time slots used by each of the other SS-TDMA transmitters in the plurality of SS-TDMA transmitters, from said transmitter-FIFO memory as TDMA data;
  a demultiplexer, coupled to said TDMA subsystem and having a first plurality of outputs and a second plurality of outputs, for demultiplexing the TDMA data into a first plurality of sub-data-sequence signals and a second plurality of sub-data-sequence signals, with a respective sub-data-sequence signal at a respective output of said demultiplexer;
  chip-sequence means for outputting a plurality of chip-sequence signals, with each chip-sequence signal orthogonal to the other chip-sequence signals in said plurality of chip-sequence signals;
  a first plurality of product devices, coupled to the first plurality of outputs of said demultiplexer, respectively, and to said chip-sequence means, for multiplying each of the first plurality of sub-data-sequence signals, by a chip-sequence signal of the plurality of chip-sequence signals, respectively, thereby generating a first plurality of spread-spectrum channels;
  a second plurality of product devices, coupled to the second plurality of outputs of said demultiplexer, respectively, and to said chip-sequence means, for multiplying each of the second plurality of the sub-data-sequence signals, by a chip-sequence signal of the plurality of chip-sequence signals, respectively, thereby generating a second plurality of spread-spectrum channels;
  a first combiner, coupled to the first plurality of product devices, for algebraically combining the first plurality of spread-spectrum channels as a first multichannel-spread-spectrum signal;
  a first header device, coupled to said first combiner, for concatenating a header for chip-sequence synchronization, to the first multichannel-spread-spectrum signal, thereby generating a first SS-TDMA signal;
  a second combiner, coupled to the second plurality of product devices, for algebraically combining the second plurality of spread-spectrum channels as a second multichannel-spread-spectrum signal;
  a second header device, coupled to said second combiner, for concatenating a header for chip-sequence synchronization, to the second multichannel-spread-spectrum signal, thereby generating a second SS-TDMA signal;
  a transmitter-carrier subsystem, coupled to said first header device and said second header device, for transmitting on a carrier frequency the first SS-TDMA signal and the second SS-TDMA signal as a quadrature-amplitude modulated (QAM) SS-TDMA signal using radio waves over a communications channel; and a plurality of SS-TDMA receivers, each SS-TDMA receiver including,
  a translating device, coupled to the communications channel, for translating the QAM-SS-TDMA signal from the carrier frequency to a processing frequency;
  a header-matched filter, coupled to said translating device and having an impulse response matched to the header, for detecting, at the processing frequency, at least one of the first header and the second header in the QAM-SS-TDMA signal, and for outputting, responsive to detecting at least one of the first header and the second header, a header-detection signal;
  a first plurality of data-matched filters, coupled to said translating device, with each data-matched filter having an impulse response matched to a chip-sequence signal of the plurality of chip-sequence signals, respectively, for despreading the first multichannel-spread-spectrum signal embedded in the SS-TDMA signal as a first plurality of received spread-spectrum channels, respectively;
  a second plurality of data-matched filters, coupled to said translating device, with each data-matched filter having an impulse response matched to a chip-sequence signal of the plurality of chip-sequence signals, respectively, for despreading the second multichannel-spread-spectrum signal embedded in the SS-TDMA signal as a second plurality of received spread-spectrum channels, respectively;
  a multiplexer, coupled to said first plurality of data-matched filters and to said second plurality of data-matched filters, for multiplexing the plurality of received spread-spectrum channels as received-TDMA data; and
  a receiver TDMA subsystem for selecting the received-TDMA data from a particular time slot as received data.

13. The SS-TDMA system as set forth in claim 12, with said chip-sequence means including a chip-sequence generator for generating the plurality of chip-sequence signals.

14. The SS-TDMA system as set forth in claim 12, with said chip-sequence means including a memory for storing the plurality of chip-sequence signals.

15. A spread-spectrum time-division-multiple-access (SS-TDMA) system for communicating data, comprising:

a plurality of SS-TDMA transmitters, each SS-TDMA transmitter including,
  transmitter-memory means, coupled to a data input, for storing data;

transmitter-TDMA means, coupled to said transmitter-memory means, for transmitting the data from said transmitter-memory means as TDMA data, with the data from each SS-TDMA transmitter transmitted at different times from data from other SS-TDMA transmitters in said plurality of SS-TDMA transmitters;

demultiplexer means, coupled to said transmitter TDMA means and having a plurality of outputs, for demultiplexing the TDMA data into a first plurality of sub-data-sequence signals and a second plurality of sub-data-sequence signals, with a respective sub-data-sequence signal at a respective output of said demultiplexer means;

transmitter-spread-spectrum means, coupled to the plurality of outputs of said demultiplexer means, for spread-spectrum processing each of the first plurality of sub-data-sequence signals and each of the second plurality of sub-data-sequence signals by a chip-sequence signal of a plurality of chip-sequence signals, respectively, thereby generating a first plurality of spread-spectrum channels and a second plurality of spread-spectrum channels, with the respective chip-sequence signal different from each chip-sequence signal in the plurality of chip-sequence signals;

combiner means, coupled to said transmitter-spread-spectrum means, for algebraically combining the first plurality of spread-spectrum channels as a first multichannel-spread-spectrum signal and for algebraically combining the second plurality of spread-spectrum channels as a second multichannel-spread-spectrum signal;

header means, coupled to said combiner means, for adding a first header for chip-sequence synchronization, to the first multichannel-spread-spectrum signal, thereby generating a first SS-TDMA signal, and for adding a second header for chip-sequence synchronization, to the second multichannel-spread-spectrum signal, thereby generating a second SS-TDMA signal; and transmitter-carrier means, coupled to said header means, for combining the first SS-TDMA signal and the second SS-TDMA signal as a quadrature amplitude modulated (QAM)-SS-TDMA signal, and for transmitting at a carrier frequency the QAM-SS-TDMA signal using radio waves over a communications channel; and a plurality of SS-TDMA receivers, each SS-TDMA receiver including, header-detection means, coupled to said communications channel, and including a first header-matched filter having an impulse response matched to the first header and a second header-matched filter having an impulse response matched to the second header, for detecting at least one of the first header and the second header in the QAM-SS-TDMA signal, and for outputting, responsive to detecting at least one of the first header and the second header, a header-detection signal;

receiver-spread-spectrum means, responsive to the header-detection signal, for despreading the first multichannel-spread-spectrum signal embedded in the QAM-SS-TDMA signal as a first plurality of received spread-spectrum channels, respectively and for despreading the second multichannel-spread-spectrum signal embedded in the QAM-SS-TDMA signal as a second plurality of received spread-spectrum channels, respectively; and multiplexing means, coupled to said receiver-spread-spectrum means, for multiplexing the first plurality of received spread-spectrum channels and the second plurality of received spread-spectrum channels as received TDMA data; and receiver TDMA means, coupled to said multiplexing means, for selecting the received TDMA data from a particular time slot.

16. The SS-TDMA system as set forth in claim 15, further including translating means, coupled between the communications channel and the header-detection means, for translating the SS-TDMA-spread-spectrum signal from the carrier frequency to a processing frequency.

17. The SS-TDMA system as set forth in claim 15, further including processor means, coupled to said header-detection means, responsive to the header-detection signal, for generating control and timing signals.

18. The SS-TDMA system as set forth in claim 15, 16 or 17 with said transmitter-spread-spectrum means including:

generating means for generating the plurality of chip-sequence signals;

a first plurality of EXCLUSIVE-OR gates coupled between said demultiplexing means, said combiner means and said generating means, for multiplying the plurality of sub-data-sequence signals by the first plurality of chip-sequence signals, respectively, thereby generating the first plurality of spread-spectrum channels; and a second plurality of EXCLUSIVE-OR gates coupled between said demultiplexing means, said combiner means and said generating means, for multiplying the plurality of sub-data-sequence signals by the second plurality of chip-sequence signals, respectively, thereby generating the second plurality of spread-spectrum channels.

19. The SS-TDMA system as set forth in claim 15, 16 or 17 with said transmitter-spread-spectrum means including a memory for storing the plurality of chip-sequence signals.

20. The SS-TDMA system as set forth in claim 15, 16 or 17 with said transmitter-spread-spectrum means including a first plurality of product devices for multiplying each of the first plurality of sub-data-sequence signals by a respective chip-sequence signal of the plurality of chip sequence signals, and a second plurality of product devices for multiplying each of the second plurality of sub-data-sequence signals by the respective chip-sequence signal of the plurality of chip-sequence signals.

21. The SS-TDMA system as set forth in claim 15, 16 or 17 with said transmitter-spread-spectrum means including a first plurality of matched filters and a second plurality of matched filters, with each of the first plurality of matched filters and each of the second plurality of matched filters having an impulse response matched to a respective chip-sequence signal of the plurality of chip-sequence signals.

22. The SS-TDMA system as set forth in claim 15, 16 or 17 with said transmitter-spread-spectrum means including a first plurality of surface-acoustic-wave devices and a second plurality of surface-acoustic-wave devices, with each of the first plurality of surface-acoustic-wave devices and each of the second plurality of surface-acoustic-wave devices having an impulse response matched to a chip-sequence signal of the plurality of chip-sequence signals, respectively.

23. The SS-TDMA system as set forth in claim 15, 16 or 17 with said receiver-spread-spectrum means including a first plurality of data-matched filters and a second plurality of data-matched filters, with each of the first plurality of data-matched filters having an impulse response matched to a chip-sequence signal of the plurality of chip-sequence signals, respectively.

24. The SS-TDMA system as set forth in claim 15 with said receiver-spread-spectrum means including a first plurality of surface-acoustic-wave devices and a second plurality of surface-acoustic-wave devices, with each of the first plurality of surface-acoustic-wave devices and each of the second plurality of surface-acoustic-wave devices having an impulse response matched to a chip-sequence signal of the plurality of chip-sequence signals, respectively.

25. A spread-spectrum receiver for receiving a spread-spectrum signal having a chip-sequence signal, comprising:

a plurality of data-matched filters, each data-matched filter having an impulse response matched to the chip-sequence signal embedded in the spread-spectrum signal, for detecting different portions of the spread-spectrum signal;

a plurality of magnitude-square devices, coupled to the plurality of data-matched filters, respectively, for determining a magnitude square of each output of the plurality of data-matched filters;

a plurality of adders, coupled to the plurality of magnitude-square devices, for adding the magnitude squares of the outputs of the plurality magnitude-square devices; and path-and-acquisition-decision logic, coupled to the plurality of adders, for selecting, from the plurality of adders, a detected path, responsive to selecting the detected path, and for outputting an acquisition signal.

26. A spread-spectrum receiver for receiving a spread-spectrum signal having a chip-sequence signal, comprising:

a plurality of data-matched-filters, each data-matched filter having an impulse response matched to the chip-sequence signal embedded in the spread-spectrum signal, for detecting different portions of the spread-spectrum signal;

magnitude-square means, coupled to the plurality of data-matched filters, respectively, for determining a magnitude square of each output of the plurality of data-matched filters;

adder means, coupled to the magnitude-square means, for adding the magnitude square of the output of the magnitude-square means; and path-and-acquisition-decision logic, coupled to the adder means, for selecting, from the adder means, a detected path, responsive to selecting the detected path, and for outputting an acquisition signal.

27. The spread-spectrum receiver as set forth in claim 26, with the magnitude-square means including a plurality of magnitude-square devices, coupled to the plurality of data-matched filters, respectively, for determining the magnitude square of each output of the plurality of data-matched filters.

28. The spread-spectrum receiver as set forth in claim 27, with the adder means including a plurality of adders, coupled to the plurality of magnitude-square devices, for adding the magnitudes of the bits in each header.

29. A spread-spectrum method for receiving a spread-spectrum signal having a chip-sequence signal, comprising:

detecting different portions of the spread-spectrum signal;

determining a magnitude square of each of the detected different portions of the spread-spectrum signal;

adding the magnitude squares;

selecting, from the added magnitude squares, a detected path;

outputting, in response to selecting the detected path, an acquisition signal.

* * * * *